(12) United States Patent
Tally et al.

(10) Patent No.: US 11,811,259 B2
(45) Date of Patent: Nov. 7, 2023

(54) POWER PACK

(71) Applicants: RENEW GROUP PRIVATE LIMITED, Singapore (SG); William Tally, Milford, MI (US); Alex Rufflo, Ferndale, MI (US); Thomas Reesbeck, Dearborn, MI (US); Jeff Drulia, Royal Oak, MI (US)

(72) Inventors: William Tally, Milford, MI (US); Alex Rufflo, Ferndale, MI (US); Thomas Reesbeck, Dearborn, MI (US); Jeff Drulia, Royal Oak, MI (US)

(73) Assignee: Renew Health Ltd, Athlone (IE)

( * ) Notice: Subject to any disclaimer, the term of this patent is extended or adjusted under 35 U.S.C. 154(b) by 425 days.

(21) Appl. No.: 16/494,941

(22) PCT Filed: Mar. 19, 2018

(86) PCT No.: PCT/US2018/023083
§ 371 (c)(1),
(2) Date: Sep. 17, 2019

(87) PCT Pub. No.: WO2018/170501
PCT Pub. Date: Sep. 20, 2018

(65) Prior Publication Data
US 2020/0044478 A1 Feb. 6, 2020

Related U.S. Application Data

(60) Provisional application No. 62/619,280, filed on Jan. 19, 2018, provisional application No. 62/567,953, filed on Oct. 4, 2017, provisional application No. 62/563,854, filed on Sep. 27, 2017, provisional application No. 62/558,574, filed on Sep. 14, 2017, provisional application No. 62/472,906, filed on Mar. 17, 2017.

(51) Int. Cl.
*H01M 10/46* (2006.01)
*H02J 7/35* (2006.01)
(Continued)

(52) U.S. Cl.
CPC ............ *H02J 7/35* (2013.01); *F21L 4/02* (2013.01); *F21L 4/08* (2013.01); *F21V 33/008* (2013.01);
(Continued)

(58) Field of Classification Search
CPC . H02J 7/355; H02J 7/00; H02J 7/0042; F21V 33/008; F21L 4/08; H01M 10/465;
(Continued)

(56) References Cited

U.S. PATENT DOCUMENTS 4,940,629 A 7/1990 Weber et al.
5,601,358 A 2/1997 Chien
(Continued)

FOREIGN PATENT DOCUMENTS

| CN | 202896023 | 10/2014 |
|---|---|---|
| WO | WO2015190492 | 12/2015 |
| WO | 2017064497 A1 | 4/2017 |
| WO | 2017070645 A1 | 4/2017 |

OTHER PUBLICATIONS

Written Opinion of the International Searching Authority, PCT/US2018/023083, dated May 17, 2018.
(Continued)

*Primary Examiner* — Edward Tso
(74) *Attorney, Agent, or Firm* — Oakland Law Group, PLLC

(57) ABSTRACT

The disclosure relates to a power pack to be used when there is a need for an efficient or portable power source, for example, when the electrical grid is saturated, overused, unreliable or inoperative. The power pack is configured to utilize a renewable energy source, such as solar energy, to charge a rechargeable battery within a battery pack. Said battery pack, through the use of a battery management system, may then provide AC or DC power to an external device that requires electricity, or store power for a later use.

9 Claims, 26 Drawing Sheets

(51) Int. Cl.

| | |
|---|---|
| *H02S 10/40* | (2014.01) |
| *H02S 40/38* | (2014.01) |
| *H02J 7/34* | (2006.01) |
| *F21L 4/02* | (2006.01) |
| *F21L 4/08* | (2006.01) |
| *F21V 33/00* | (2006.01) |
| *H01M 10/0525* | (2010.01) |
| *H01M 10/42* | (2006.01) |
| *H01M 50/247* | (2021.01) |
| *H01M 50/204* | (2021.01) |
| *F21Y 115/10* | (2016.01) |
| *H02J 7/00* | (2006.01) |

(52) U.S. Cl.
CPC ..... *H01M 10/0525* (2013.01); *H01M 10/425* (2013.01); *H01M 10/465* (2013.01); *H01M 50/204* (2021.01); *H01M 50/247* (2021.01); *H02J 7/342* (2020.01); *H02S 10/40* (2014.12); *H02S 40/38* (2014.12); *F21Y 2115/10* (2016.08); *H01M 2010/4271* (2013.01); *H01M 2220/10* (2013.01); *H02J 7/00* (2013.01)

(58) Field of Classification Search
CPC ......... H01M 50/20; H01M 2010/4271; H01M 50/247; H01M 50/204; F21Y 2115/10; H02S 40/38; H02S 10/40; Y02E 60/10; Y02E 70/30; Y02E 10/50
USPC .................................. 320/101, 107, 114, 115
See application file for complete search history.

(56) References Cited

U.S. PATENT DOCUMENTS

| | | | |
|---|---|---|---|
| D403,661 S | 1/1999 | Mariani | |
| 5,982,138 A | 11/1999 | Krieger | |
| 6,075,341 A | 6/2000 | White et al. | |
| 6,094,029 A | 7/2000 | Reynolds et al. | |
| 6,102,549 A | 8/2000 | Thomas | |
| 6,215,273 B1 | 4/2001 | Shy | |
| 6,377,029 B1 | 4/2002 | Krieger et al. | |
| 6,664,000 B1 | 12/2003 | Sonobe | |
| 6,799,993 B2 | 10/2004 | Krieger et al. | |
| 6,806,684 B2 | 10/2004 | Matsuyama | |
| 6,825,441 B2 | 11/2004 | Katooka et al. | |
| D511,491 S | 11/2005 | Hriscu | |
| D530,271 S | 10/2006 | Hriscu | |
| 7,394,220 B2 | 7/2008 | Huang | |
| D579,870 S | 11/2008 | Dunbar | |
| 7,452,099 B2 | 11/2008 | Evans et al. | |
| 7,487,771 B1 | 2/2009 | Eiffert et al. | |
| 7,528,579 B2 | 5/2009 | Pacholok et al. | |
| 7,723,958 B2 | 5/2010 | Darilek | |
| 7,745,025 B2 | 6/2010 | Leach et al. | |
| D620,886 S | 8/2010 | Fronius | |
| D625,251 S | 10/2010 | Workman et al. | |
| 7,808,211 B2 | 10/2010 | Pacholok et al. | |
| D629,746 S | 12/2010 | Workman | |
| D635,090 S | 3/2011 | Schumacher | |
| 7,969,116 B2 | 6/2011 | Aradachi et al. | |
| 7,994,753 B2 | 8/2011 | Hankui | |
| 8,040,678 B2 | 10/2011 | Tai et al. | |
| 8,058,840 B2 | 11/2011 | Daniel et al. | |
| 8,080,972 B2 | 12/2011 | Smith | |
| 8,080,975 B2 | 12/2011 | Bessa et al. | |
| D651,564 S | 1/2012 | Workman | |
| D654,863 S | 2/2012 | Schumacher | |
| 8,198,759 B2 | 6/2012 | Hurst et al. | |
| D664,499 S | 7/2012 | Workman | |
| 8,212,384 B2 | 7/2012 | Yen | |
| D670,244 S | 11/2012 | Workman | |
| 8,487,586 B2 | 7/2013 | Kasai | |
| D693,765 S | 11/2013 | Workman | |
| D695,680 S | 12/2013 | Workman | |
| D697,028 S | 1/2014 | Workman et al. | |
| 8,698,457 B2 | 4/2014 | Hogari et al. | |
| 8,847,586 B2 | 9/2014 | Suzuki | |
| D716,726 S | 11/2014 | Workman et al. | |
| D723,205 S | 2/2015 | Prommel et al. | |
| 9,024,570 B2 | 5/2015 | Workman et al. | |
| 9,054,556 B2 | 6/2015 | Hoshino | |
| 9,131,560 B2 | 9/2015 | Williams et al. | |
| 9,184,476 B2 | 11/2015 | Suzuki | |
| 9,249,995 B2 | 2/2016 | Krantz et al. | |
| 9,267,417 B2 | 2/2016 | Baldwin | |
| D753,059 S | 4/2016 | Krantz | |
| 9,312,706 B2 | 4/2016 | Workman et al. | |
| 9,362,766 B2 | 6/2016 | Workman et al. | |
| 9,368,769 B2 | 6/2016 | Kim | |
| 9,368,992 B2 | 6/2016 | Suzuki | |
| 9,385,351 B2 | 7/2016 | Workman et al. | |
| 9,490,510 B2 | 11/2016 | Takahashi et al. | |
| D773,992 S | 12/2016 | Krantz et al. | |
| 9,515,500 B2 | 12/2016 | Workman et al. | |
| 9,525,289 B2 | 12/2016 | Yoshida | |
| 9,553,286 B2 | 1/2017 | Moon et al. | |
| 9,553,287 B2 | 1/2017 | Kim et al. | |
| 9,553,481 B2 | 1/2017 | Prommel et al. | |
| D780,116 S | 2/2017 | Bing | |
| D781,229 S | 3/2017 | Krantz et al. | |
| 9,627,721 B2 | 4/2017 | Kosaki et al. | |
| 2005/0092356 A1 | 5/2005 | Sakai et al. | |
| 2005/0161276 A1* | 7/2005 | Jones | B62K 5/025 180/68.5 |
| 2008/0053510 A1* | 3/2008 | Lin | H02S 30/20 136/243 |
| 2008/0084182 A1* | 4/2008 | Oberlin | H01M 10/052 320/116 |
| 2008/0088266 A1* | 4/2008 | Lucas | A01D 34/78 318/441 |
| 2008/0238370 A1* | 10/2008 | Carrier | H01M 50/20 320/136 |
| 2010/0065108 A1 | 3/2010 | West et al. | |
| 2010/0156339 A1 | 6/2010 | Hoffman | |
| 2010/0307479 A1* | 12/2010 | Park | H02S 20/32 126/714 |
| 2011/0162690 A1 | 7/2011 | Workman et al. | |
| 2011/0290307 A1 | 12/2011 | Workman et al. | |
| 2012/0091955 A1* | 4/2012 | Gao | H01M 50/244 320/109 |
| 2013/0008483 A1 | 1/2013 | Chaney | |
| 2013/0043826 A1 | 2/2013 | Workman et al. | |
| 2013/0257346 A1* | 10/2013 | Jakins | H02J 7/35 320/107 |
| 2013/0278063 A1* | 10/2013 | Fowler | H02S 40/38 307/43 |
| 2014/0210399 A1* | 7/2014 | Urschel | H02J 7/0045 320/107 |
| 2014/0230188 A1 | 8/2014 | Knorrn et al. | |
| 2014/0285342 A1* | 9/2014 | Makino | H02S 40/38 340/556 |
| 2015/0214519 A1 | 7/2015 | Ringer et al. | |
| 2016/0013675 A1 | 1/2016 | Workman et al. | |
| 2016/0173026 A1 | 1/2016 | Goei et al. | |
| 2016/0181587 A1* | 6/2016 | Koebler | H01M 50/597 429/7 |
| 2016/0218401 A1* | 7/2016 | Hermann | H01M 50/209 |
| 2016/0368464 A1* | 12/2016 | Hassounah | B60L 53/80 |
| 2016/0380247 A1* | 12/2016 | Juzkow | H01M 10/4257 429/99 |
| 2017/0040801 A1 | 2/2017 | Robison et al. | |
| 2017/0040932 A1 | 2/2017 | Lillywhite et al. | |
| 2017/0047755 A1 | 2/2017 | Workman et al. | |

OTHER PUBLICATIONS

Product page from Anker Inc. retrieved Mar. 2, 2017.
International Report on Patentability PCT/US2018/022839, dated Sep. 19, 2019.

\* cited by examiner

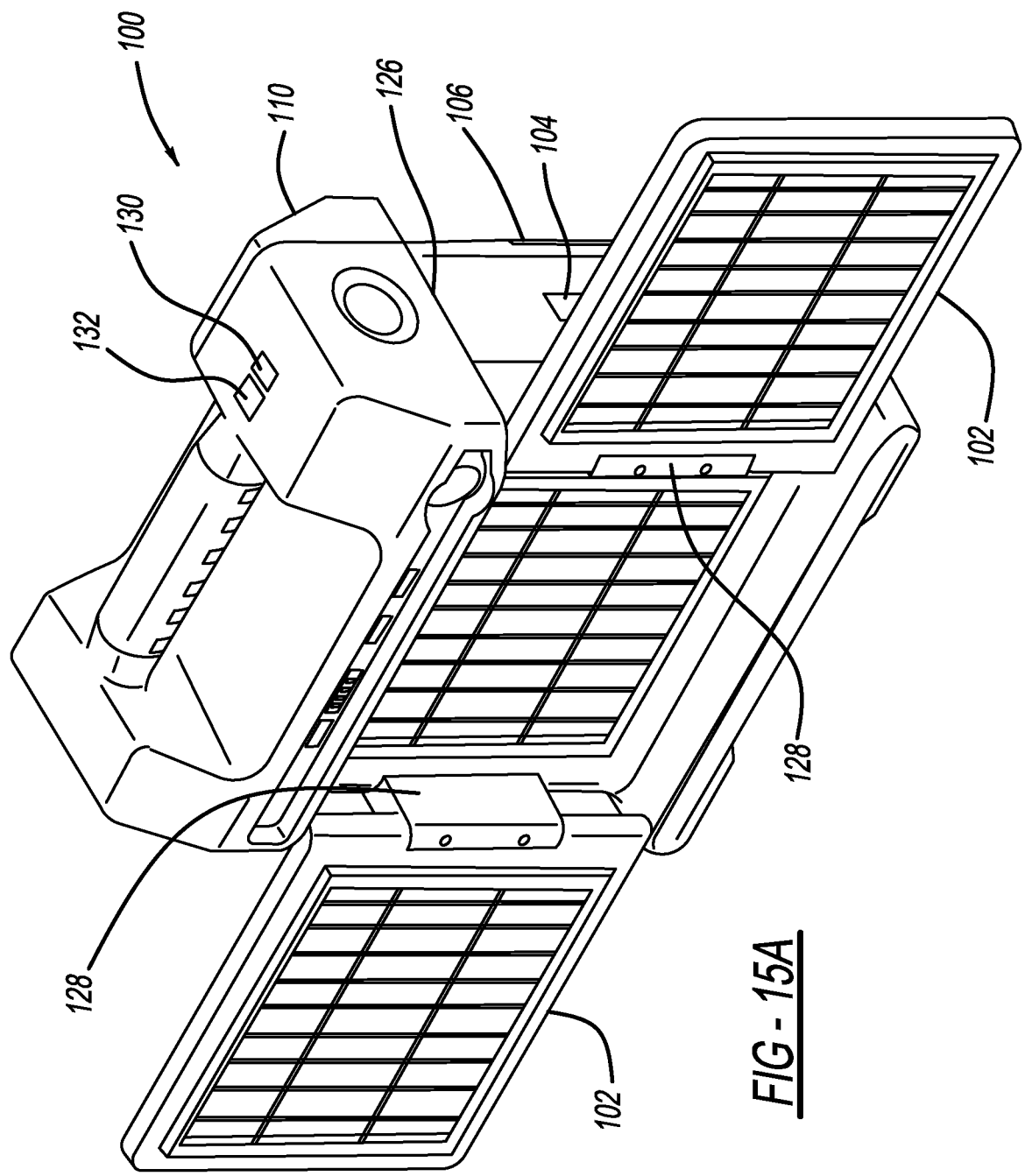

POWER PACK

CROSS-REFERENCE TO RELATED APPLICATIONS:

This application is a national stage entry of PCT/US2018/023083, filed Mar. 19, 2018, which claims the benefit of provisional application Ser. No. 62/472,906 filed Mar. 17, 2017, provisional application Ser. No. 62/558,574, filed Sep. 14, 2017, provisional application Ser. No. 62/563,854, filed, Sep. 27, 2017 provisional application Ser. No. 62/567,953 filed Oct. 4, 2017, and provisional application Ser. No. 62/619,280 filed Jan. 19, 2018, all of which are incorporated by reference herein.

BACKGROUND

In many circumstances, access to a power grid may be difficult or impossible. For example, power grids often do not extend into many areas because of, for example, the costs of establishing and maintaining a grid infrastructure or the constraints of the local terrain. However, there may be still be a need or desire to have access to electrical power in these or other areas. In addition, access to an electrical grid may be available but the grid may be overused, saturated or may become inoperative. In these situations, there may be a need for a power source to provide emergency, back-up or supplemental power.

In addition, an individual may not wish to be tied to a location because of a requirement for access to an electrical grid but may prefer to have a source of power which could be used in different locations and situations. For example, recreational campers may wish to have a rechargeable source of power, which may be used in isolated places to power lights or other devices. A reliable source of power would also be useful in emergency situations. Further, business owners may require a source of power to conduct business operations out of doors or indoors. In these and other situations, a reliable, efficient source of power is essential. Also, it would be highly desirable for the source of power to be portable such that it may be easily moved or carried to different locations. It would also be desirable if the power source could be recharged by an energy source. It would be particularly desirable if the power pack could be recharged, and it would be particularly preferred if the power source could be recharged by renewable energy sources. It would also be desirable if the power source retained its electrical charge once the power source is charged.

Consequently, there is a need for a reliable, efficient, power source that supplies power to a range of devices in a range of situations. The present disclosure relates to power packs that address the requirement for power in the described and other situations.

SUMMARY

The disclosure relates a power pack, includes a battery pack with at least one battery, a case with at least solar panel integrated into the case, at least one output port, at least one input port, a battery management system; and at least one light, projecting light away from said case.

DETAILED DESCRIPTION

Figure 1:
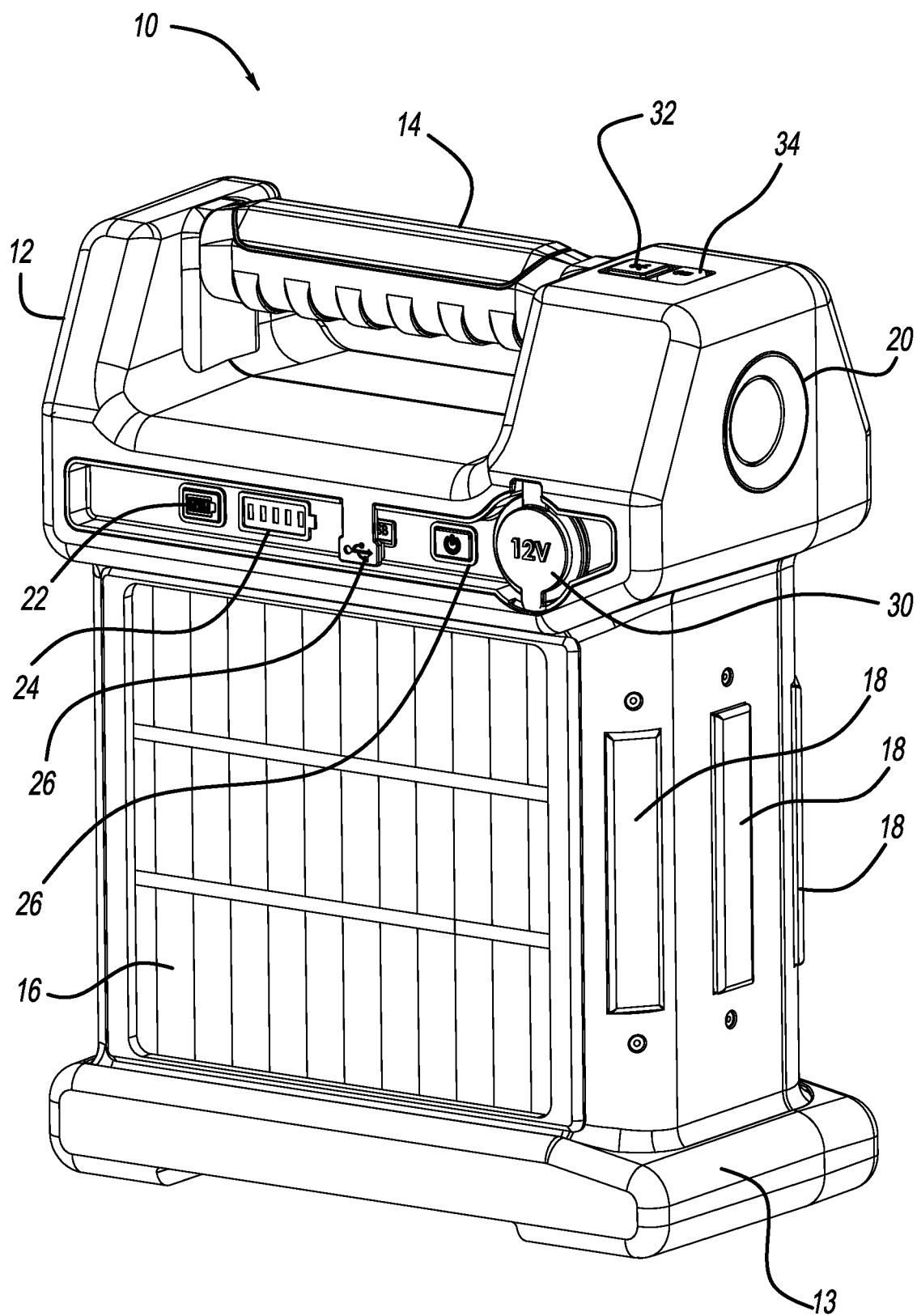
FIG. 1 shows a perspective view of a power pack according to the disclosure

It is to be understood that the disclosed examples that follow are merely exemplary and specific details disclosed herein are not to be interpreted as limiting, but merely as a basis for the claims and as a representative basis for teaching one skilled in the art. The systems and methods described herein are not limited in their application to the details of construction and the arrangement of components set forth in the description or illustrated in the drawings. Also, the phraseology and terminology used herein is for the purpose of description and should not be regarded as limiting. The use of "including", "comprising", "having", "containing", "involving" and variations thereof herein, is meant to encompass the items listed thereafter, equivalents thereof, and additional items, as well as alternate examples consisting of the items listed thereafter exclusively.

The present disclosure relates to power packs. Power packs of the disclosure may be used in situations, for example and without limitation, where there is a need for an efficient power source, a power source that is portable, where there is no access to a power grid, where it is desirable to use renewable energy or combinations of these requirements. In some preferred examples, power packs of the disclosure may be used to store power until required, for both long or short-term requirements in residential or commercial situations. Power packs of the disclosure may be used to provide power devices that when the electrical grid is saturated, overused, unreliable or inoperative. In preferred examples, power packs of the disclosure retain an electrical charge when charged. In preferred examples, the power pack is rechargeable.

According to the disclosure, a power pack may be used to provide energy to, charge or power external devices that require electricity including, for example and without limitation, mobile phones, other handheld devices, lights, appliances, batteries, or battery packs. A power pack may be used to provide direct current (DC) to devices that use or require DC. In some preferred examples, a power pack may be used to provide power to devices that require alternating current (AC). A power pack may, for example, include an inverter integrated into the power pack where the inverter converts DC to AC for a particular requirement, such as device that requires AC. In other examples, an external inverter may be used with a power pack of the disclosure. In preferred examples, a power pack may be used to provide power to at least two different devices simultaneously where the at least two devices both require DC or both require AC or one device requires AC and a second device requires DC.

A power pack of the disclosure may assume a variety of shapes and sizes. For example, a power pack may be an approximately cuboid shape. In other examples, a power pack may be approximately cylindrical or approximately spherical. In preferred examples, a power pack may be approximately briefcase-shaped with a handle. In preferred examples, a power pack may be placed in containers or carried for storage or transportation, including, for example, backpacks, suitcases or other forms of luggage A power pack may be stored or carried on modes of transportation such as, for example and without limitation, bicycles, motorcycles, carts or cars.

According to preferred examples, a power pack is portable. For example, some power packs of the disclosure may be carried by hand by one individual. In preferred examples, a power pack may have at least one handle such that a power pack may be carried easily by hand. In preferred examples, the at least one handle is placed at the top of the case. In other examples, power packs of the disclosure may have two or more handles placed at the sides of the power pack.

A power pack may also be linked or connected to external devices that may be used to charge at least one battery cell associated with, integrated with or belonging to the power pack For example, at least one battery cell may be charged by one or more types of devices. For example, and without limitation, a power pack may be charged by solar energy sources, wind energy sources, other types of mechanically-generated energy sources, charged by fuel-driven generators, or charged by connecting to an electrical grid or some combination of these methods. In some preferred examples, the power pack may be charged by connecting the power pack to a bicycle where the pedaling the bicycle charges the power pack using an alternator or similar device. A power pack according to the disclosure may be connected to an electrical power grid that provides alternating current such that the battery cells may be charged by this source.

In preferred examples, the power pack may be charged using solar energy, either as the only charging source or in parallel or combination with other charging sources. For example, the power pack may be linked to at least one solar panels that charge the power pack by converting light energy to electricity.

A power pack of the disclosure may be also charged using alternating current. For example, the power pack may be charged with commercial battery chargers such as are used for laptop computers, hand-held devices.

In preferred examples, the dimensions of the power pack are from about 8 inches to about 25 inches in height, about 5 inches to about 20 inches in width and about 3 inches to about 10 inches in depth. In particularly preferred examples, a power pack is about 12 inches by about 9.5 inches by about 5 inches. In further preferred examples, the power pack is about 12.5 inches by about 10 inches by about 8 inches. In further preferred examples, the power pack is about 12.5 inches by about 10 inches by about 8 inches where the output is 600W, 750 W or 900W.

According to preferred examples, a power pack according to the disclosure weighs from about three to 50 pounds (about 1.4 to about 23 kilograms). According to preferred examples, a power pack of the disclosure may weigh from about 4 pounds to about 30 pounds (about 1.8 to about 9 kilograms). In particularly preferred examples, a power pack may weigh from about five to about 10 pounds (about 1.8 to about 4.5 kilograms). In further preferred examples, a power pack weighs about seven pounds (about 3.2 kilograms). In other preferred examples, a power pack weighs about 5.4 pounds. In other preferred examples, a power pack weighs about 9 pounds, or about 11 pounds or about 13 pounds.

In some examples, a power pack may approximately 15 pounds. In some preferred examples, a power pack weighs about 15 pounds and has an output of 600W.

In some preferred examples, a power pack according to the disclosure is about 11.60 inches in length by a width of 7.6 inches by 13.3 inches in height.

In preferred examples, the weight of a power pack may vary through the addition or removal of components. For example, an individual may choose to add or subtract battery cells or battery packs, thereby increasing or decreasing the weight of a power pack. A power pack of the disclosure may have one or more solar panels integrated with or connected to a power pack. In some examples, at least one or more panels may be added or removed as required, thereby altering the weight of the power pack. In preferred examples, the removal of battery cells, battery packs, or solar panels may be reversible.

According to the disclosure, a power pack includes a case, at least one battery cell, at least one port for charging the at least one battery cell and at least one port for supplying power to an external electronic device.

According to preferred examples, the case is formed from one or more durable materials. For example, a case may be made from at least one plastic material, a combination of plastic materials, at least one metal or a combination of metals, or a combination of metals and plastic materials. In preferred examples, the case material may withstand or tolerate external forces, such as being dropped, without loss of function. In additional examples, the case material may be formed from one or more lightweight materials. In preferred examples, the case may be formed from a durable and lightweight material. In preferred examples, the case is formed from a plastic that is resistant to degradation by sunlight, including ultraviolet light. In some examples, the plastic may be include materials that help to reduce degradation by ultraviolet light, such as, for example carbon. In preferred examples, a case is formed from a plastic that is heat-resistant. In preferred examples, the case is both heat-resistant and resistant to degradation to by ultraviolet light. A power pack may include components made of rubber that also act to reduce the effect of impact. For example, the case may include rubber "bumpers" placed on the case to provide impact-resistance.

In preferred examples, the case is approximately briefcase shaped. In preferred examples, the case is manufactured in several parts and assembled. In preferred examples, power packs are assembled and sealed such that the parts are not easily disassembled by a user. In further examples, the case may be assembled and latched together. In this way, the case may be able to be disassembled by a user such that the user may then easily add or remove components such as battery packs or battery cells. The case may include a base portion where the power pack rests on the base portion.

According to the disclosure, a power pack includes one or more battery cells. In preferred examples, a power pack includes at least two battery cells. In preferred examples, the one or more battery cells are electrically connected to at least one jack or port on a power pack to allow charging of the battery cells by one or more external sources. In some examples, the one or more battery cells may be removable from the case such that the one or more battery cells may be charged outside of a power pack and then returned to a power pack after charging.

In preferred examples, the two or more battery cells are connected to each other. In preferred examples, a power pack may have at least one battery pack of battery cells that where the battery cells are connected to each other while contained in the battery pack. Power packs of the disclosure may have multiples of battery packs such as from one battery pack to about 10 battery packs or from one battery back to six battery packs. Battery packs may be added or subtracted from a power pack of the disclosure to change the power output of a power pack. The battery pack may have three cells, or four cells, or five cells, or six cells, or seven cells. In preferred examples, a battery pack has eight cells. In preferred examples, a power pack has two battery packs of eight cells, or three battery packs of eight cells, four battery packs of eight cells, or five battery packs of eight cells, or six battery packs of eight cells or seven battery packs of eight cells. For example, power packs having a nominal output of 150W, of 300W, of 450W, of 600W, of 750W, of 900W or more may be created by adding or subtracting battery packs to a power pack.

The cells within the battery pack may be connected in series or parallel or may be connected in some combination of series or parallel. In preferred examples, the battery pack has an even number of cells. Each half of number of cells are connected in series and each half is connected in parallel with the other half.

The battery pack may include a container in which the at least one battery cell may be placed. In preferred examples, the battery pack may be easily inserted or removed from a power pack case. The battery pack container may be formed from a material that is impact resistant and heat resistant. In preferred examples, the battery pack container may be formed from acrylonitrile butadiene styrene (ABS).

In preferred examples, the nominal voltage of each cell is about 3.7 volts. In preferred examples, a power pack has a voltage of from about 2 volts to about 40 volts or about 5 to about 40 volts or about 10 to about 20 volts. In preferred examples, the voltage of a power pack is about 16.8 volts. In other preferred examples, the voltage is about 32.8 volts. In one example, a power pack is about 14.4V and a maximum voltage of 16.8V. In one example, a power pack is about 14.4V and a maximum voltage of 16.8V and a power output of 600W.

In preferred examples, a power pack delivers five amp-hour to 40 amp-hour or seven amp-hour to 30 amp-hour. In preferred examples, a power pack delivers 10 amp-hour. In further examples, a power pack delivers 20 amp-hour or delivers 30 amp-hour. In preferred examples, a power pack of the disclosure has about 10 amp hours to about 40 amp hours battery capacity.

In preferred examples, a power pack of the disclosure provides from about 50 watt hours to about 2000 watt hours. In preferred examples, a power pack provides from about 100 watt hours to about 1600 watt hours. In particularly preferred examples, power packs of the disclosure may provide about 150 watt hours, about 300 watt hours, about 450 watt hours, about 600 watt hours, about 750 watt hours, about 900 watt hours or about 1200 watt hours.

According to the disclosure, the battery cells are rechargeable. In preferred examples, the battery cells are lithium-ion battery cells. In preferred examples, the power pack has lithium manganese nickel batteries or lithium ion INR batteries. In other examples, the battery cells are lead-acid battery cells.

In preferred examples, a power pack of the disclosure has self-resetting fuses.

In preferred examples, battery calls associated with power pack may be charged using solar energy. In particularly preferred examples, a power pack includes one or more solar cells integrated into case of a power pack. For example, one or more solar panels may be inserted or integrated into one or more external sides of the case of a power pack. The solar panels may be integrated into one or more sides of a power pack case such that the cells are not easily removed or dislodged. For example, one or more solar panels may be mounted into a recess on one side of the case, using glue or other forms of attachment. During use, a power pack may be positioned so that light impinges on the one or more integrated solar cells. In some examples, a power pack may have at least one or more support structures where the support structure may be deployed to place a power pack at an angle to maximize the amount of sunlight impinging on the at least one solar panel. In preferred examples, the at least one support structure may allow a power pack to be positions at different angles as the position of light changes through the day or due to changes in location.

Figure 15B:
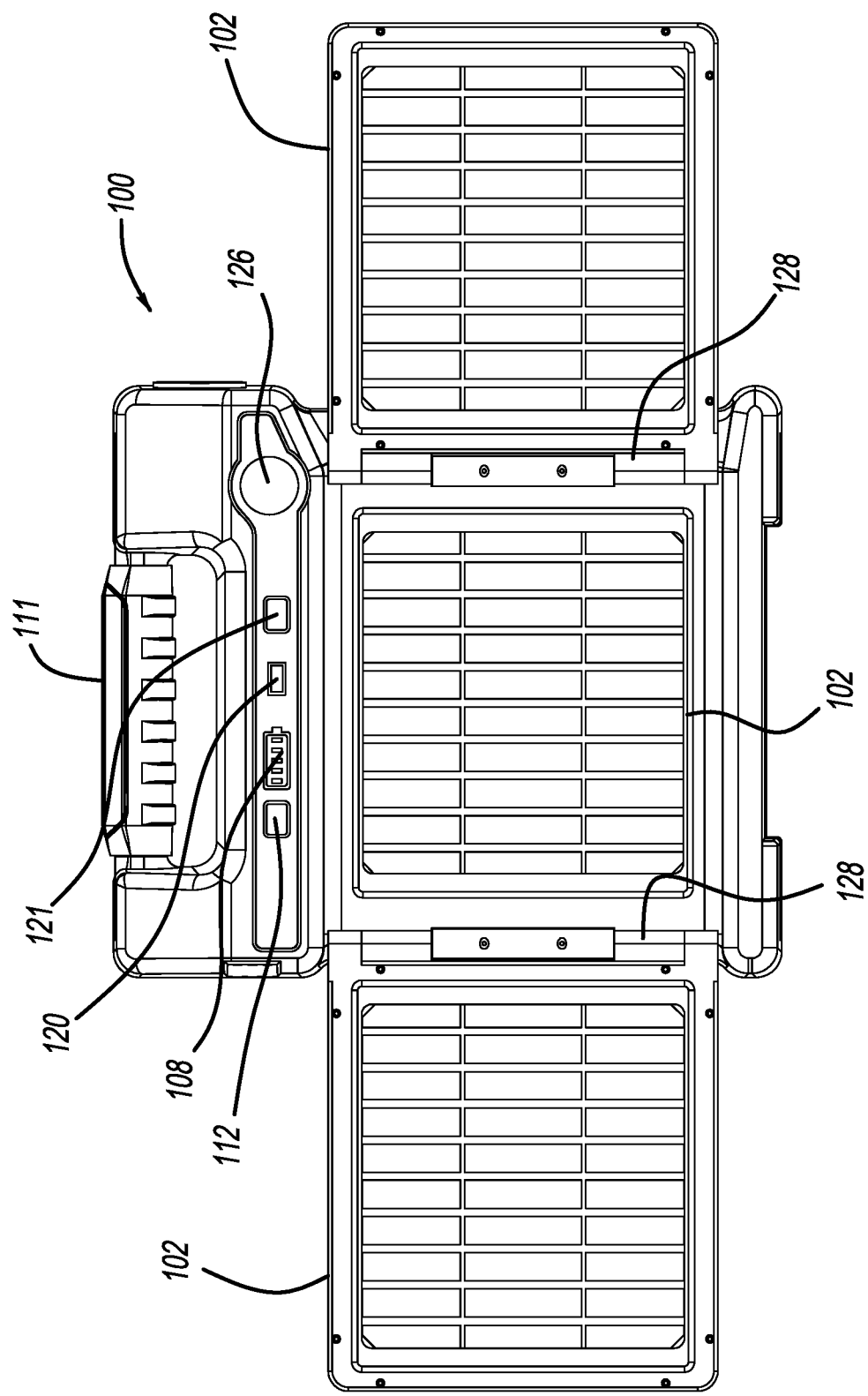
FIGS. 15 A-D show an example of a power pack according to the disclosure where the solar panels are exposed to light having been rearranged.
Figure 15C:
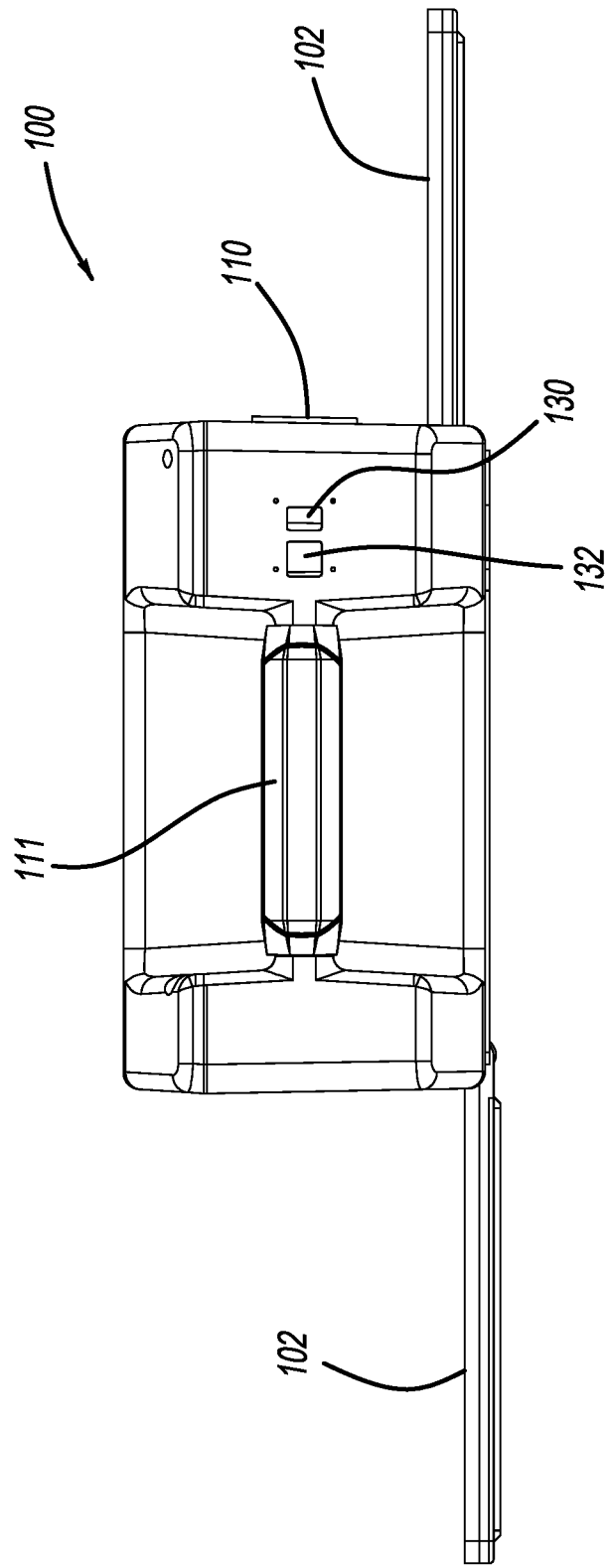
Figure 15D:
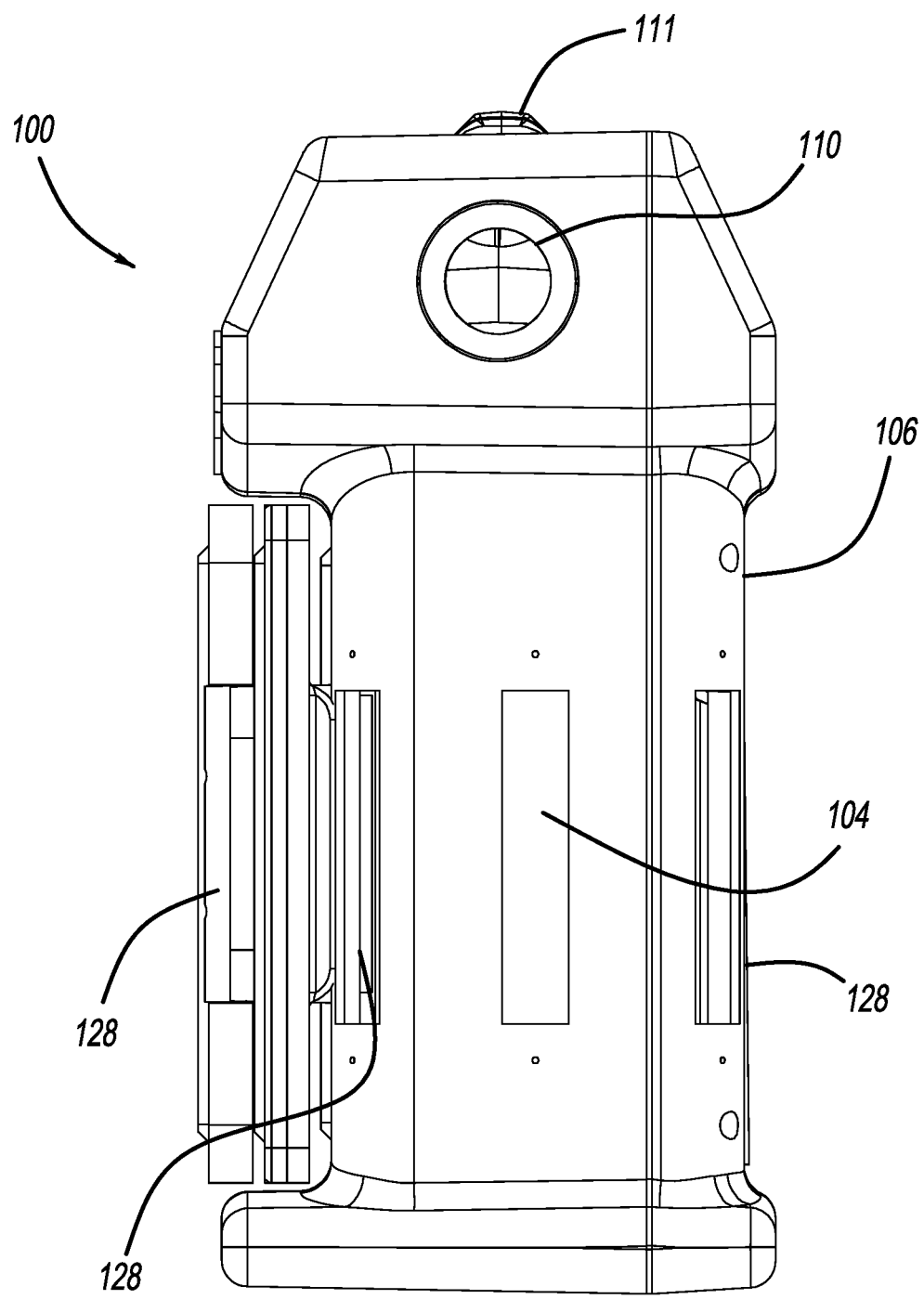
Figure 16:
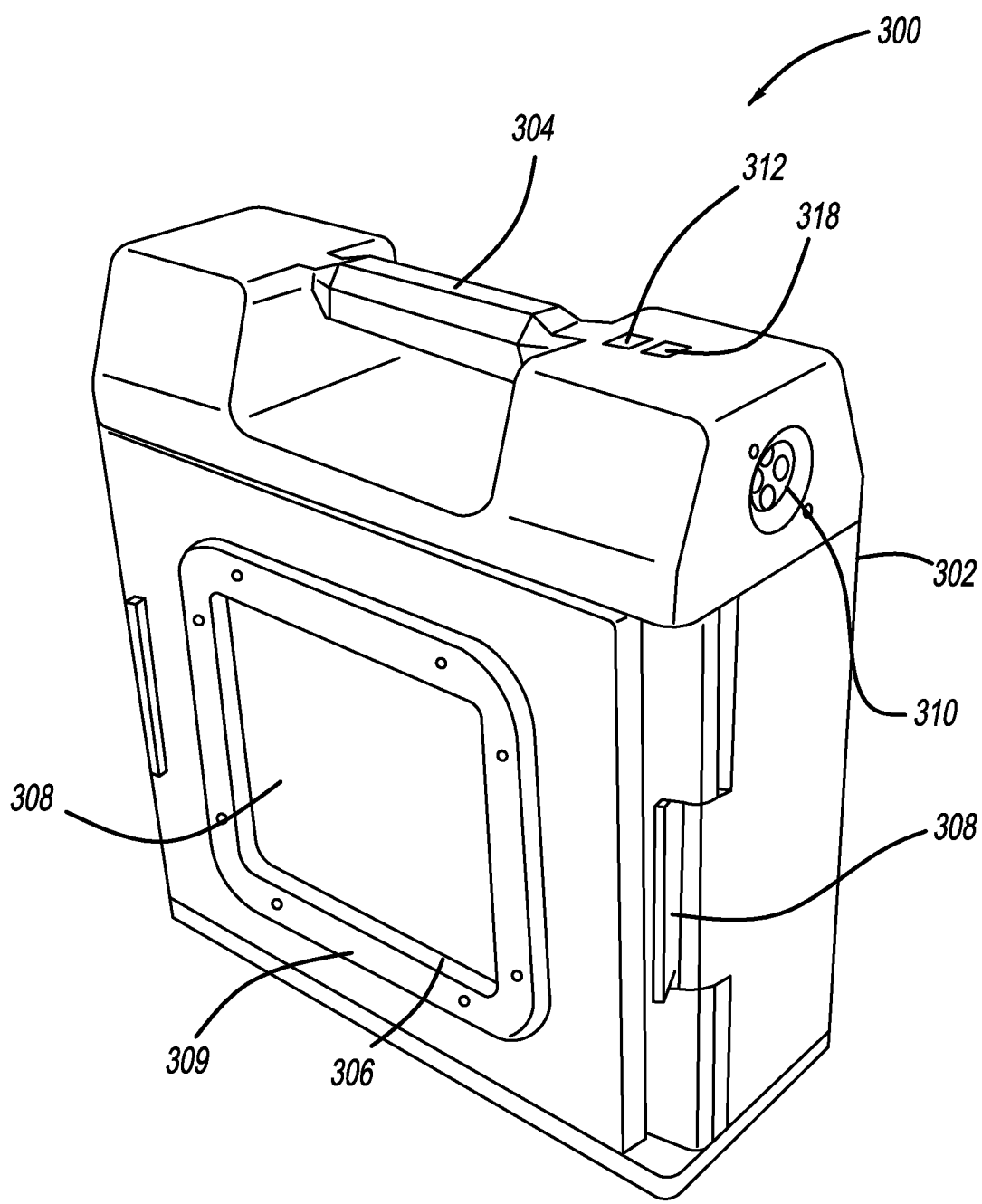
FIG. 16 shows an example of a power according to the disclosure where the power pack includes a lightboard that may be rearranged.

In some examples, there are at least two solar panels that are attached to the power pack, integrated with the power pack or otherwise form part of the power pack. In some examples, the solar panels may be hidden, collapsed, arranged or folded such that the panels are not exposed to light. In these examples, the panels may be unfolded, deployed or rearranged such that the one or more panels become exposed to light. In some examples, as shown in FIGS. 15 and 16, there may be three solar panels which may form part of the power pack. In this example, the solar panels are attached to the power pack with hinges. As shown in FIG. 15, the three solar panels may be folded such that one or more of the solar panels is not exposed to light. In this and other examples, the power pack may still be used to supply power to external devices or to devices integrated into the power pack. As shown in FIG. 16, the solar panels in this and similar examples may be unfolded to expose open or more solar panels to light, thereby allowing the power pack to be charged. In this mode, the power pack simultaneously may be charged using the solar panels and also provide power to one or more devices. In some examples, each of the solar panels are equal in dimensions. In particularly preferred examples, a power pack has three 4.5 watt solar panels. In examples with three solar panels, a power pack may weigh about 9 pounds and deliver 10 amp hours or weigh about 11 pounds and deliver about 20 amp hours or weigh 13 pounds and deliver about 30 amp hours. In one preferred example, a power pack with three solar panels may be about 12 inches wide by about 13 inches high by about 6.5 inches deep when the panels are not exposed. When the panels are exposed the width of the panels is about 27 inches. The height of each panel is about 6 to about 7 inches.

In other examples, solar panels attached to the power pack may be hidden from light by reversibly sliding the panels out of exposure to light. According these examples, the panels may be then moved into sun exposure by sliding the panels back into position.

In preferred examples, the at least one solar panel is formed from monocrystalline silicon. The solar panel may be formed from one more solar cells formed from monocrystalline silicon. In preferred examples, each solar panel may be from about 300 mm by about 100 mm, or about 250 mm by about 150 mm or from about 195 mm to about 175 mm. In preferred examples, the output of the solar cell is from about 1 watt to about 10 watts or from about 2 watts to about 6 watts or from about 3 watts to about 5 watts. In preferred examples, the power output is from 3 to about 5 watts. In additional preferred examples, each solar cell has a power In these examples, the integrated solar panels may provide an output from about 10 watts in aggregate to about 20 watts aggregate or from about 5W to about 14 watts total. In other examples In some examples, two or more power packs may be connected together when in use. For example, the two or more power packs may be connected together to provide electricity to one or more external devices. For example, the connected power packs may power one or more externally connected lights. In further examples, two or more power packs may be connected to be charged together by an external power source.

A power pack may have ports integrated into the case. The ports may be used to connect devices to a power pack, including, and without limitation, mobile phones, lights, speakers, USB-compatible devices, devices to charge the battery cells, or combinations thereof. In preferred examples, a power pack includes a 2.1 ampere USB output power port. In preferred examples, a power pack includes a 3 ampere trip circuit for the USB port. In preferred examples, a power pack includes a 12-volt DC power port. In preferred examples, a power pack includes a 15-amp trip circuit for the 12-volt DC power port. In preferred examples, a power pack of the disclosure may have up to about 17V DC output.

In some preferred examples, a power pack of the disclosure may include an inverter or similar device that converts direct current (DC) to alternating current (AC). In preferred examples, the inverter or similar device is operational from 150 watts to 1500 watts. In preferred examples, the inverter is located within the case of a power pack.

Power packs of the disclosure may also power devices incorporated or integrated into the power pack. In preferred examples, a power pack may include at least one light where the light may be powered by the power pack. According to preferred examples, a power pack may have lights integrated into the body of a power pack. The lights may be powered by one or more battery cells contained within a power pack and may project light away from a power pack. The lights may be mounted such that light may be projected at different angles. For example, the lights may be adjustable or rotatable. A power pack may have a combination of different lights for use in different situations. For example, a power pack may have at least one "spot" light, and at least two "area" lights. Each area light may project light in a desired direction. In preferred examples, each area light may a "strip" of three area lights. In some examples, a power pack may allow the lights to deliver multiple intensities using alternate switches. In some examples, power packs of the disclosure may have at least one array of lights, such as at least one lightboard. For example, the at least one lightboard may include from about 4 to about 100 lights or from about 8 to about 80 lights, or from about 20 to about 60 lights. In preferred examples, the at least one lightboard has about 32 lights. In preferred examples, the lights, are in at least in part, LED lights, including dimmable LED lights. The at least one lightboard may be integrated into the case of a power pack. For example, the at least one lightboard may be integrated into one or more sides of the case.

The lights may be, for example and without limitation, LED (Light-emitting diode) lights, halogen lights, incandescent light bulbs, fluorescent lamps or combinations of these lights. In preferred examples, the lights of a power pack include LED lights.

According to the disclosure, each light may consume from about 0.1 Watts to about 100 Watts or from about 0.2 to about 60 Watts or from about 0.5 Watts to about 40 Watts. In preferred examples, a power pack of the disclosure has LED lights where each light consumes about one (1) watt.

According to the disclosure, power packs have a charge (input) jack or port. In preferred examples, a power pack has a 20 amp input jack.

Figure 11:
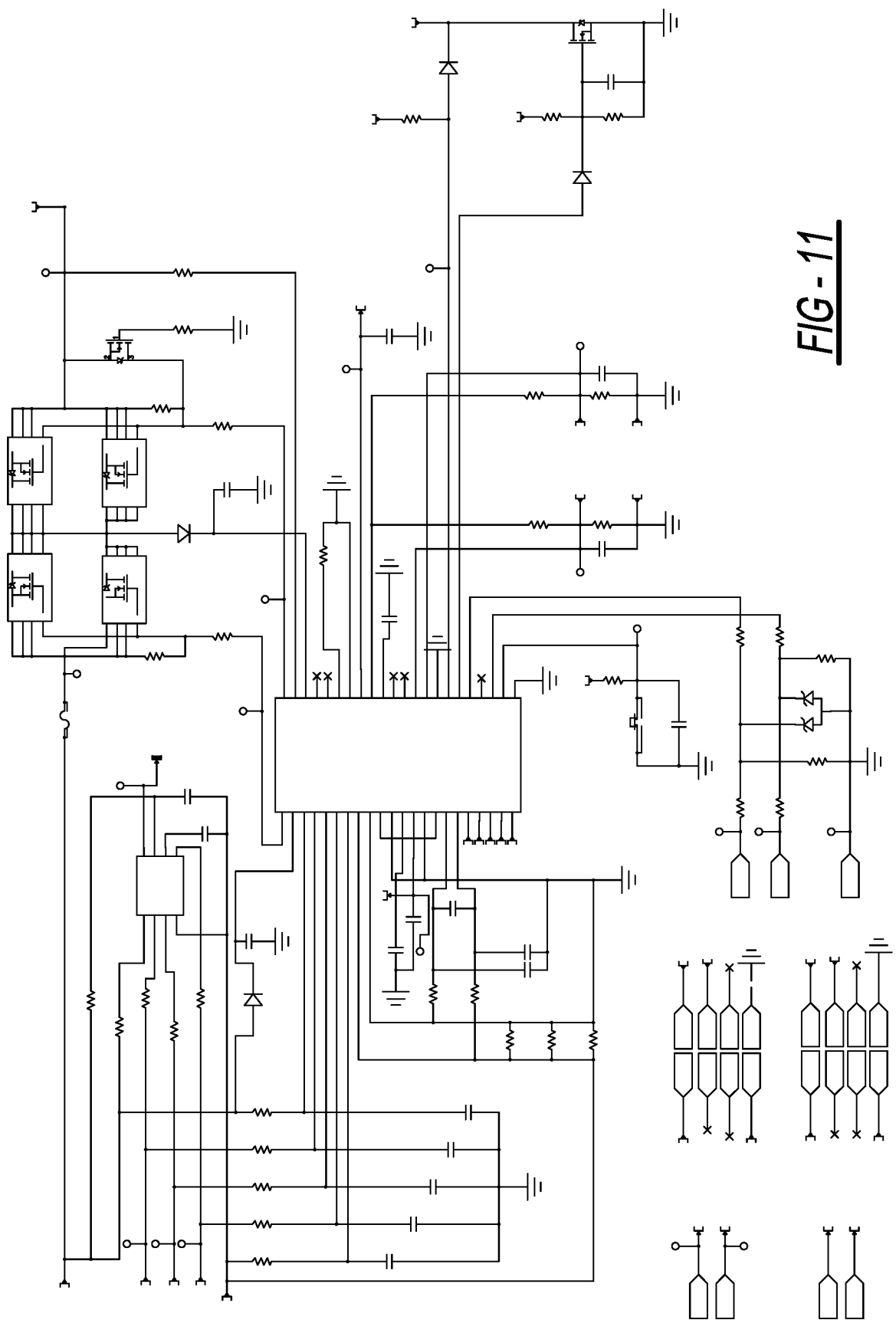
FIG. 11 shows a schematic of the circuits of one example of a power pack according to the disclosure
Figure 12:
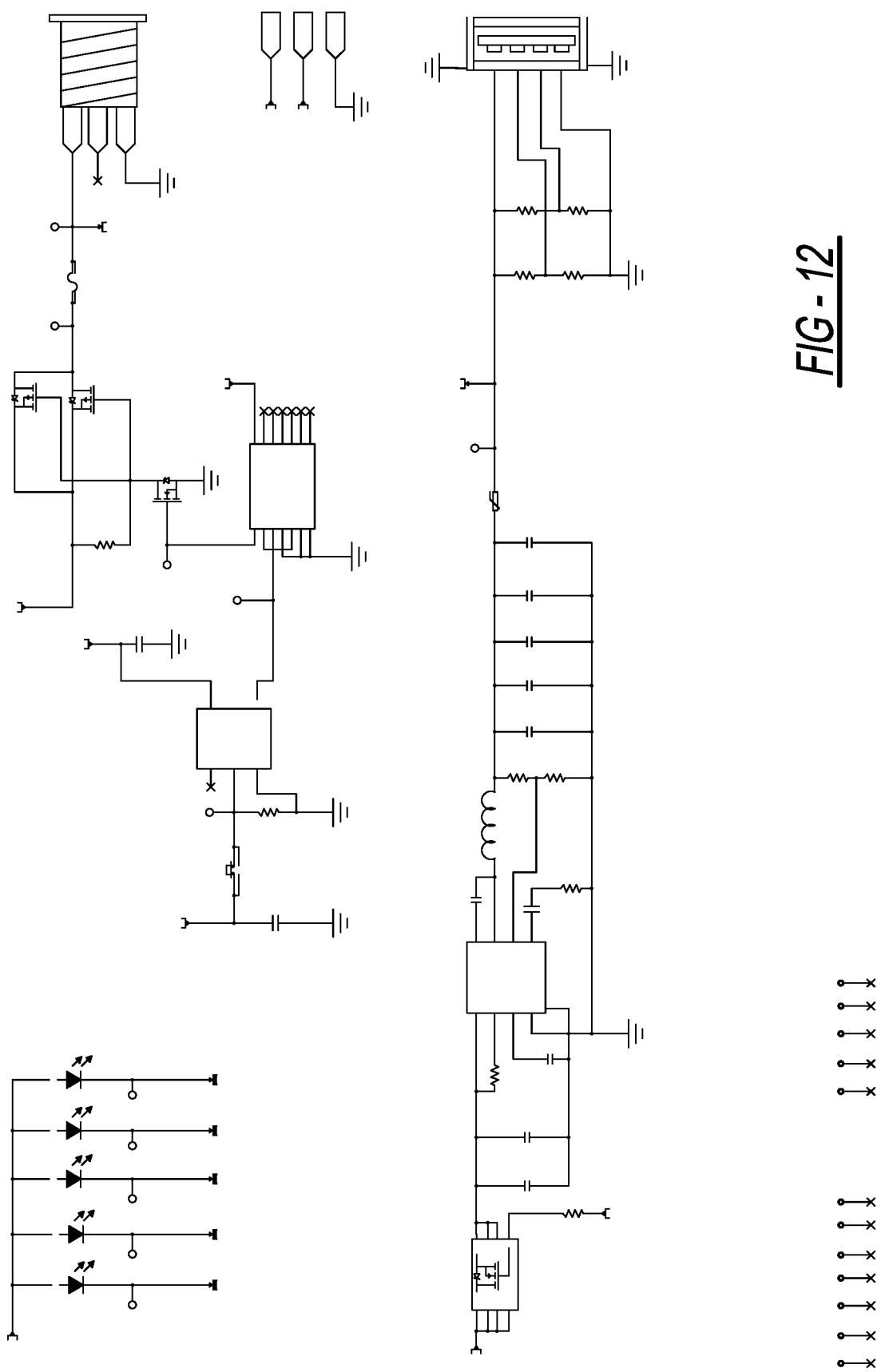
FIG. 12 shows further schematics of the circuits of one example of a power pack according to the disclosure FIG. 13a, b, c shows an additional example of a power pack according to the disclosure as seen from various sides.

According to the disclosure, a power pack according includes components that monitor and control the operation of a power pack. For example, in preferred examples, a power pack includes components that monitor battery usage and other aspects of the battery pack and power pack. In preferred examples, a power pack includes at least one thermistor to monitor temperature of a power pack. In preferred examples, the at least thermistor may be placed near or adjacent to the battery pack to monitor the temperature of the battery cells during operation. In particularly preferred examples, the power pack has two thermistors to monitor battery cell temperature. FIGS. 11 and 12 shows further schematics of the circuits of one example of a power pack according to the disclosure.

FIG. 1 shows one example of a power pack as seen in a perspective view as seen from one side. Power pack 10 includes case 12 with handle 14 and base 13. Solar panel 16 is shown in this view. A power pack includes an LED lights 18 and spotlight 20. This view shows a battery level indicator 24 with corresponding switch 22. This view also shows USB power port 26. A 12V power port is also shown 30 with corresponding switch 28. Switches 32 and 34 are used to regulate spotlight 20 and LED lights respectively.

Figure 2:
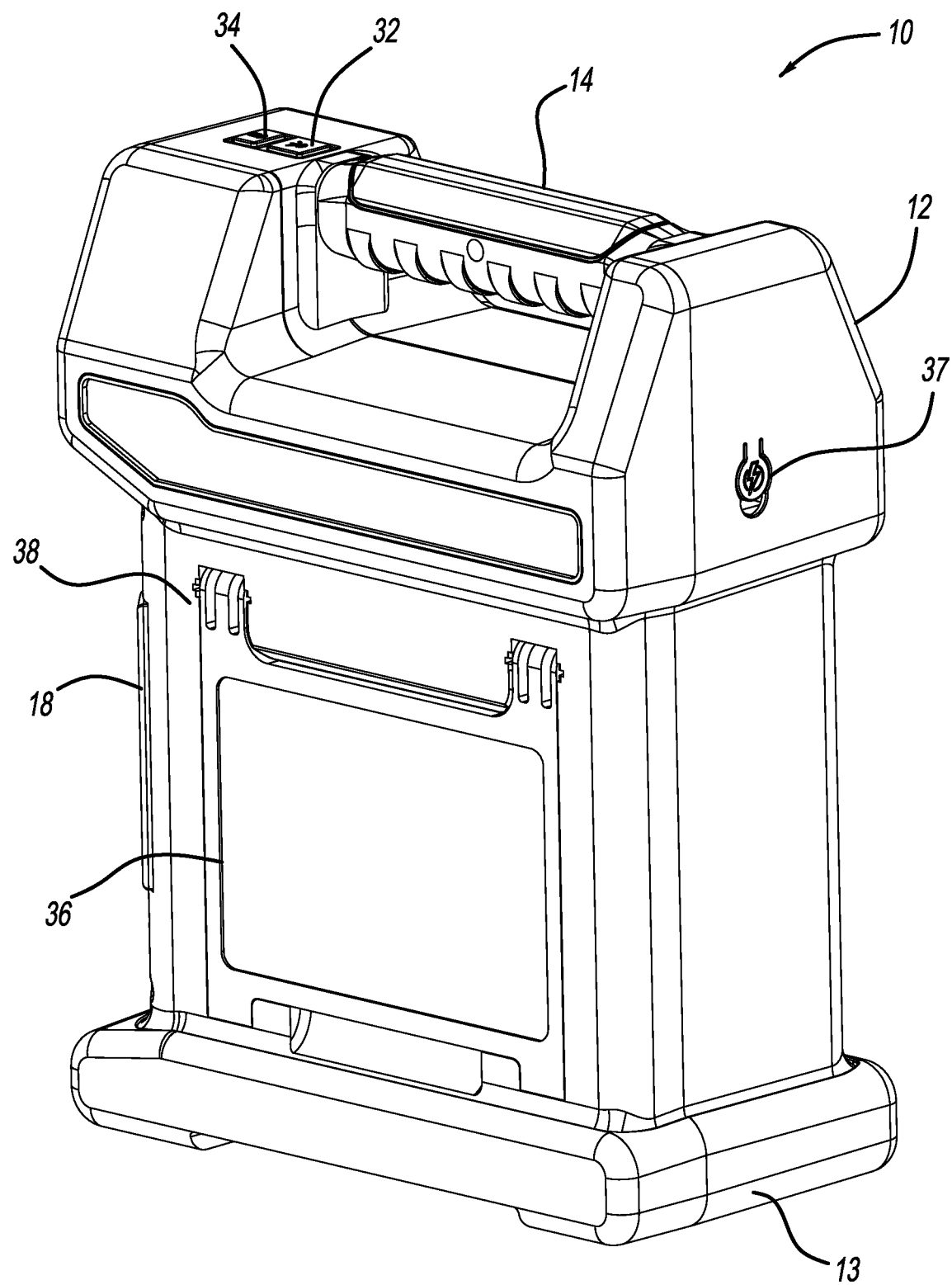
FIG. 2 shows a perspective view of a power pack according to the disclosure

FIG. 2 shows one example of a power pack as seen in a perspective view a seen from one side. Power pack 10 includes case 12 with handle 14 and base 13. Also shown in this view is support structure 36 with hinges 38 where the support structure is not deployed. This view also shows light switches 32 and 34 and charging port 37. LED light 18 is shown.

Figure 3:
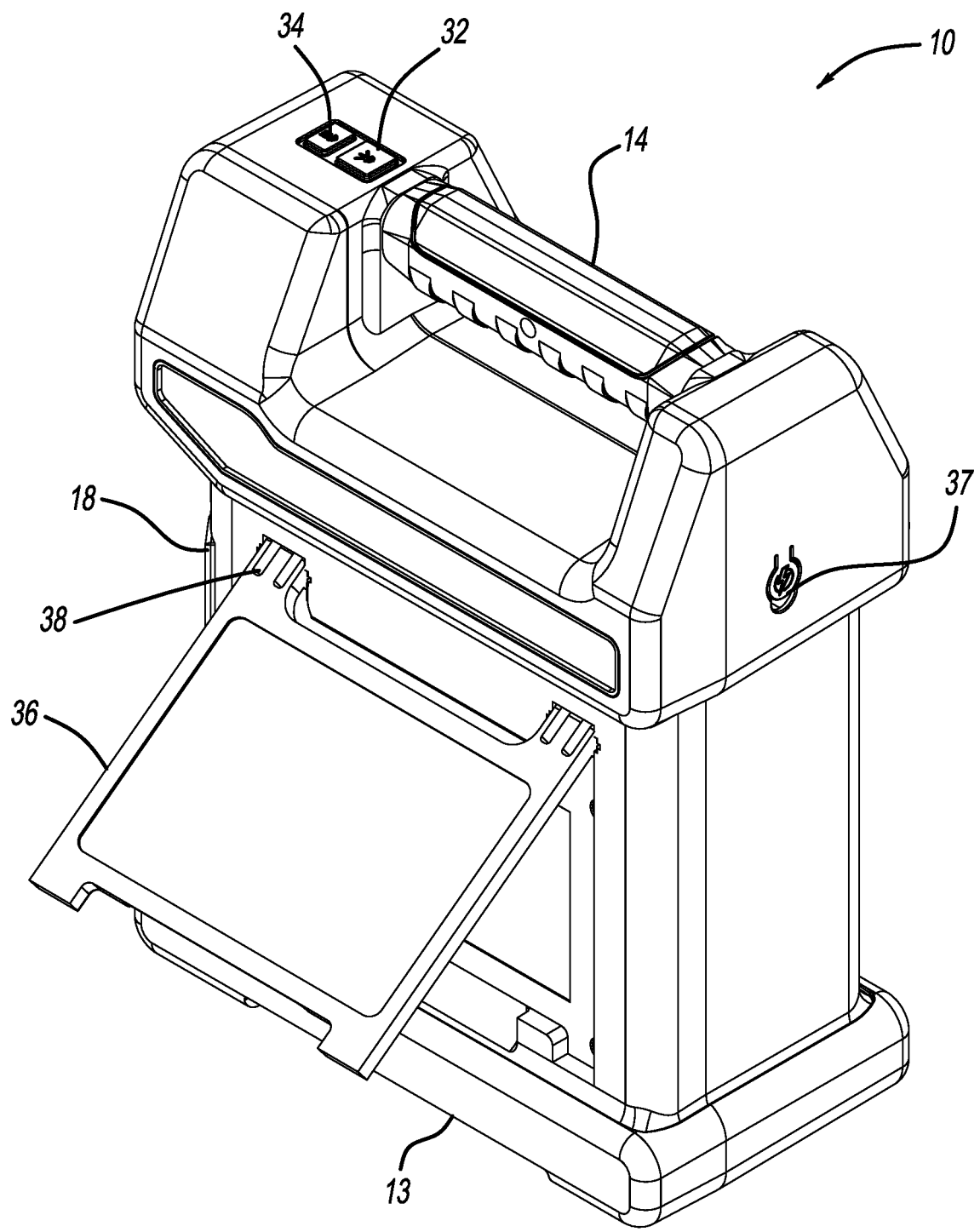
FIG. 3 shows a perspective view of a power pack according to the disclosure showing the deployment of a support structure

FIG. 3 shows a similar view of a power pack as seen FIG. 2 but with support structure 36 shown deployed. Power pack 10 includes case 12 with handle 14 and base 13. Also shown in this view is support structure 36 with hinges 38. A power pack includes LED lights 18. Switches 32 and 34 are used to regulate spotlight 20 and LED lights respectively. Charge port 37 is also shown.

Figure 4:
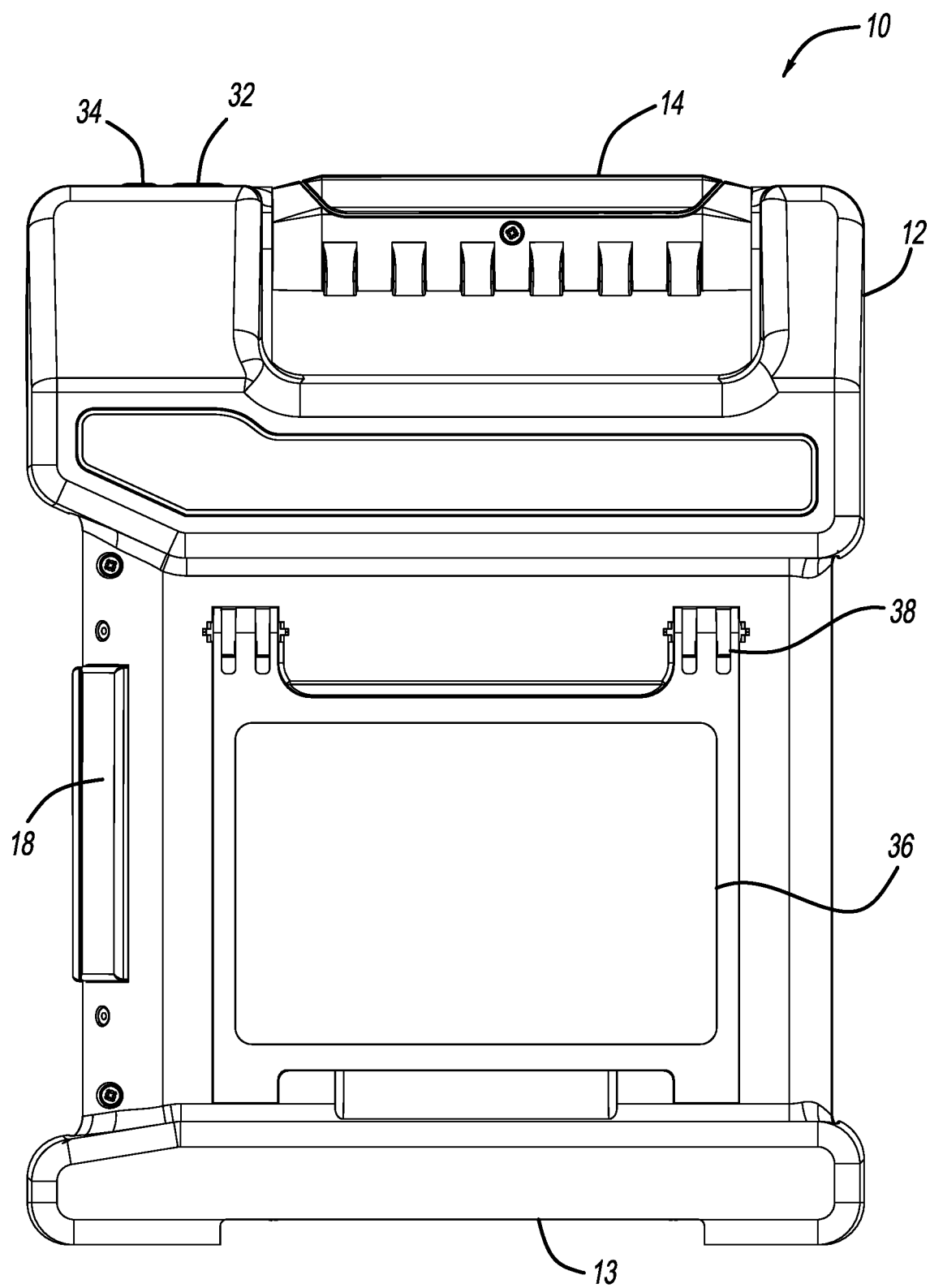
FIG. 4 shows an example of a power pack as seen from one side.

FIG. 4 shows one example of a power pack view as seen from one side. Power pack 10 includes case 12 with handle 14 and base 13. Also shown in this view is support structure 36 with hinges 38.

Figure 5:
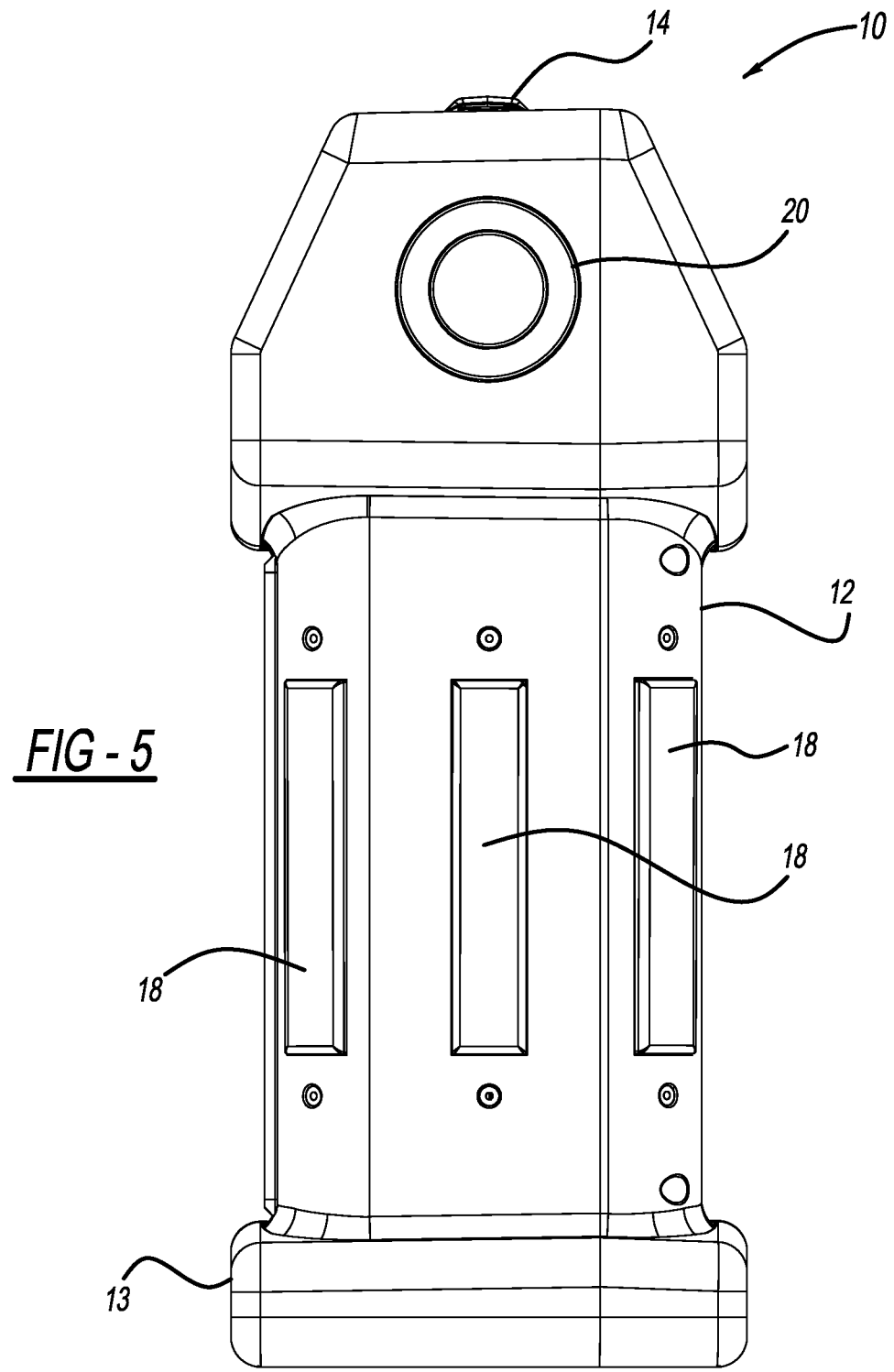
FIG. 5 shows an example of a power pack as seen from one side.

FIG. 5 shows one example of a power pack as seen in a perspective view as seen from one side. Power pack 10 includes case 12 with handle 14 and base 13. Spotlight 20 is shown as ells as LED lights 18.

Figure 6:
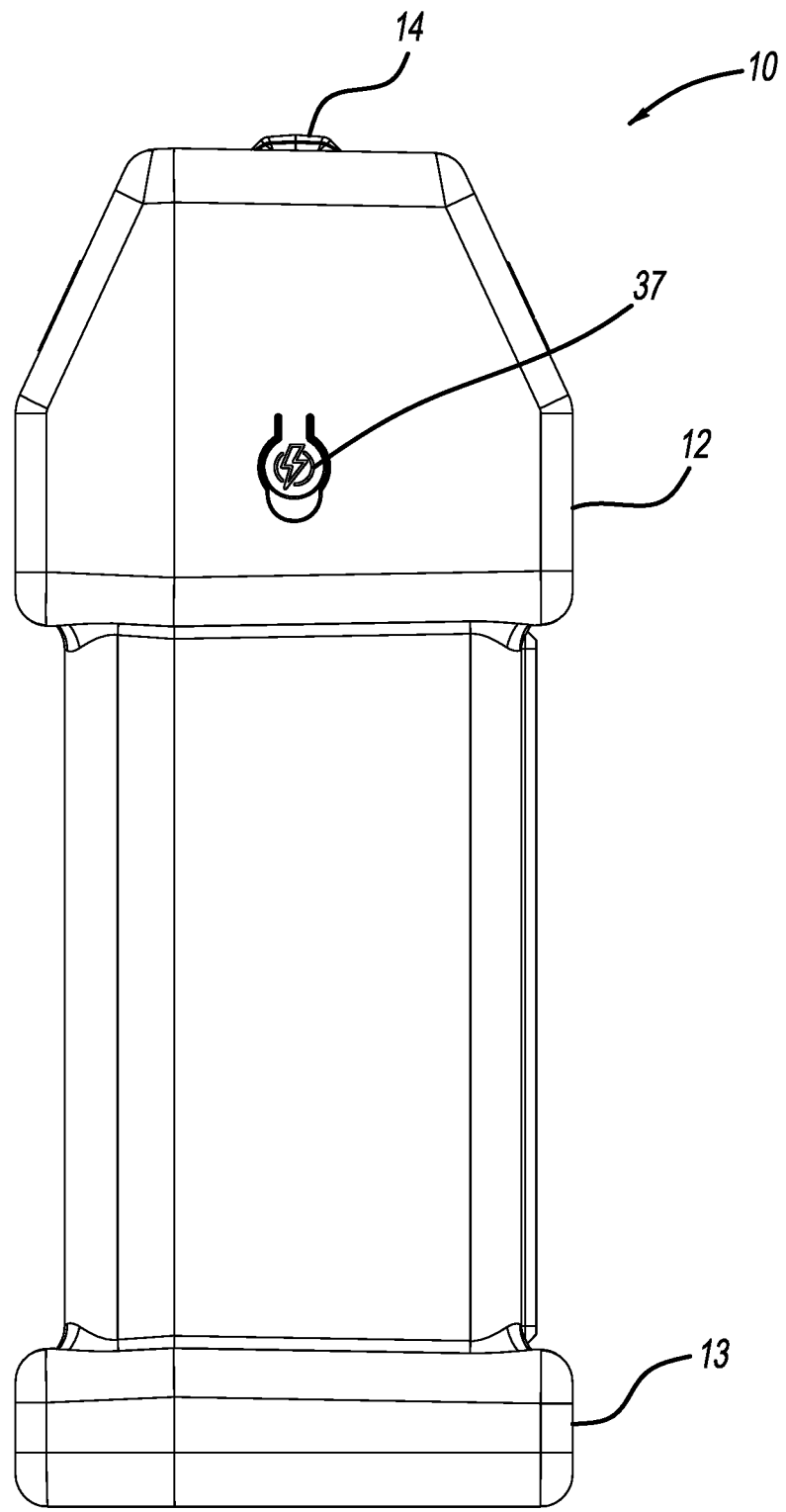
FIG. 6 shows an example of a power pack as seen from one side.

FIG. 6 shows one example of a power pack as seen from one side. Power pack 10 includes case 12 with handle 14 and base 13. Charging port 37 is shown.

Figure 7:
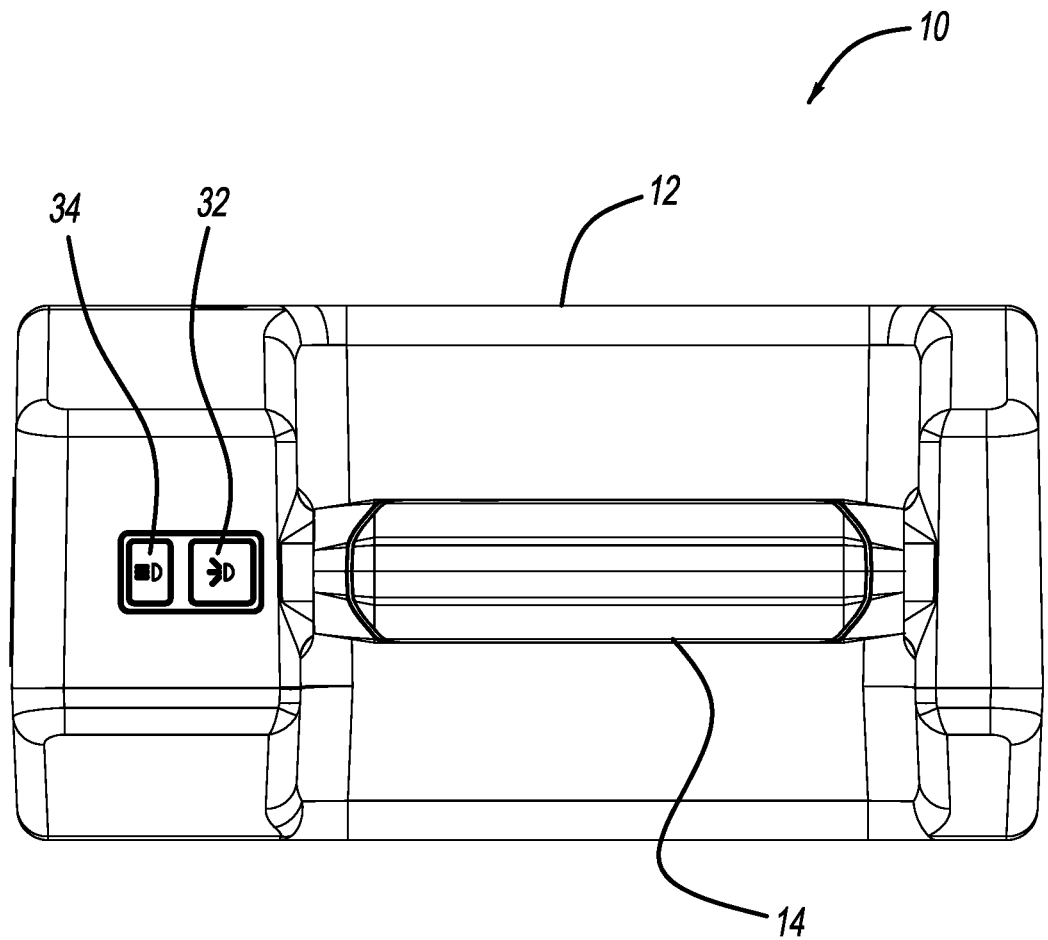
FIG. 7 shows an example of a power pack as seen from above

FIG. 7 shows an example of a power pack of the disclosure as seen from above. Power pack 10 includes case 12 with handle 14. Light switches 32 and 34 are also shown.

Figure 8:
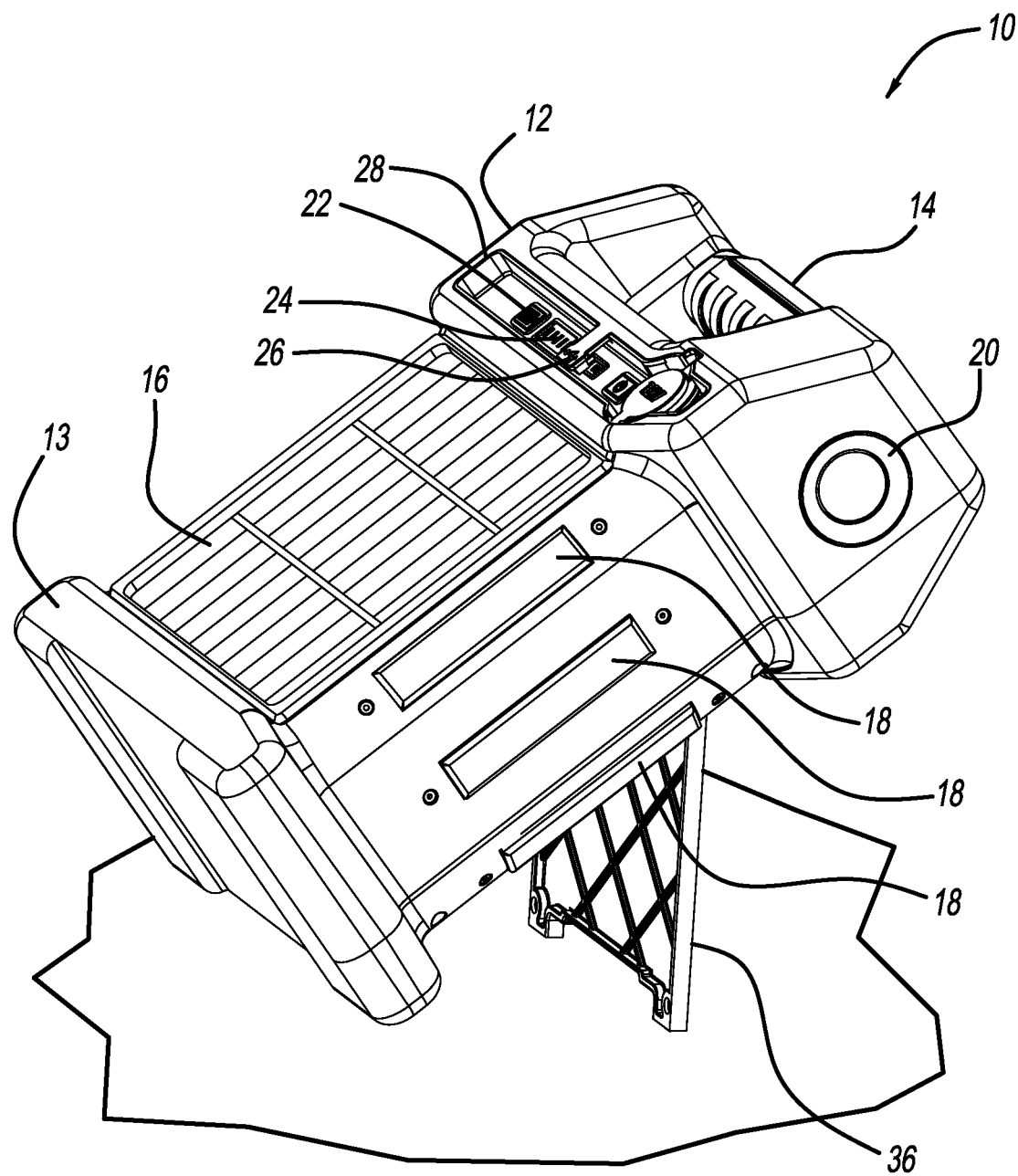
FIG. 8 shows an example of a power pack with the support structure deployed.
Figure 9:
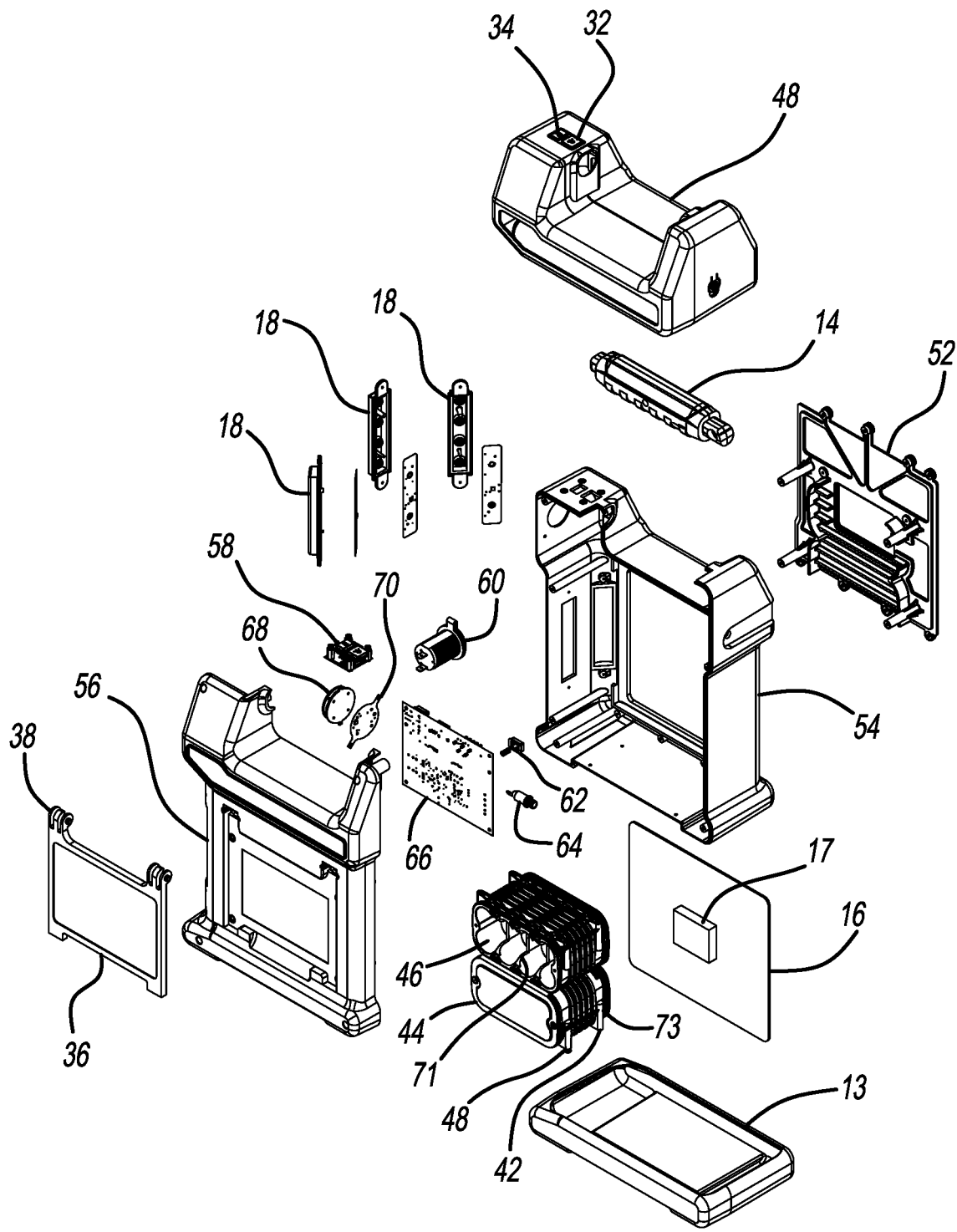
FIG. 9 shows an exploded view of the interior of a power pack of the disclosure

FIG. 8 shows an example of a power pack shown in perspective view with the support structure deployed. Power pack 10 includes case 12 with handle 14 and base 13. Solar panel 16 is shown in this view as well as support structure 36. A power pack includes an LED lights 18 and spotlight 20. This view shows a battery level indicator 24 with corresponding switch 22. This view also shows USB power port 26. A 12V power port is also shown 30 with corresponding switch 28. Switches 32 and 34 are used to regulate spotlight 20 and LED lights 18 respectively FIG. 9 shows an exploded view of the interior of a power pack of the disclosure where a power pack includes 16 cells. Power pack 10 includes handle 14 and base 13. Case components 48, 52, 54 and 56 are illustrated as well as support structure 36 with hinges 38 and solar panel 16 with connectors 17. LED lights 18 are shown as well as spotlight 68 with lens 70. Circuit board 66 includes the battery management system. Battery packs 42 are shown with the lid 44 shown on one pack and the other pack shown without a lid to illustrate slots 46 for placement of battery cells. Also shown is switches 32, 34, 58 and 12 V plug 60 with on/off switch 62. Charging jack 64 is shown. In this example, the battery pack includes eight (8) cells. The battery pack includes eight cylindrical slots 71 where cylindrical batteries are inserted in the slots. In other examples, the batteries may have other shapes and may fit into slots designed to accommodate the batteries. In other examples, there may be 2 to 10 battery packs enclosed in the case. The battery pack(s) are electrically connected 73 to the battery management system. The battery packs may be individually connected to the battery management system or may be linked to each other and then linked to the battery management system.

Figure 10A:
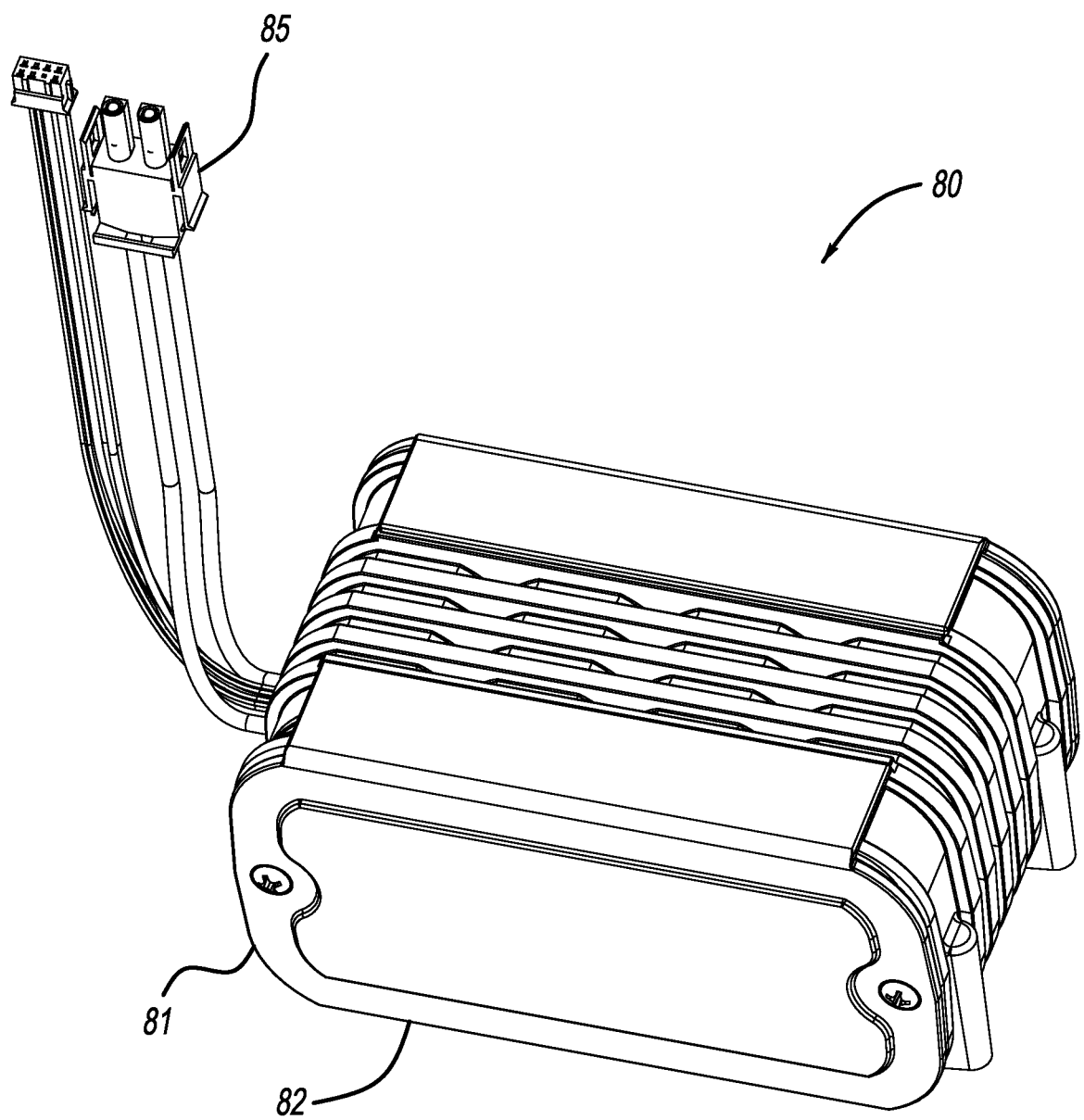
FIGS. 10a and b shows an enlargements of examples of battery packs
Figure 10B:
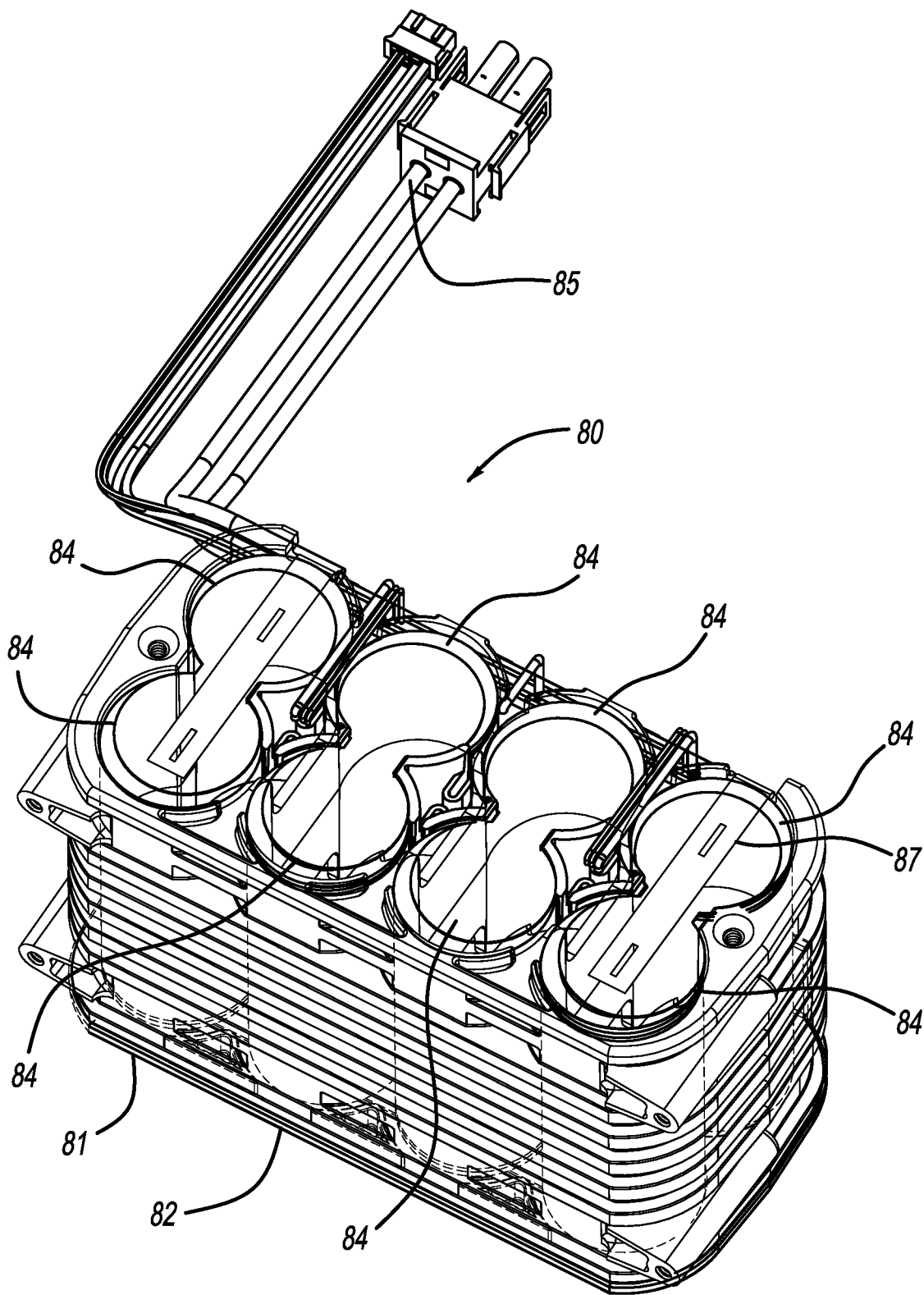

FIGS. 10a and b shows an example of battery pack according to the disclosure. FIG. 10a shows battery pack 80 with body 81 and lid 82 and connectors 85. FIG. 10b shows the battery pack 80 with body 81 and lid removed and showing battery cell holders 84 with contacts 87.

FIG. 11 show a schematic of the circuits for an example of a battery management system of a power pack. FIG. 12 shows a further schematic of the circuits of an example of a power pack.

Figure 13A:
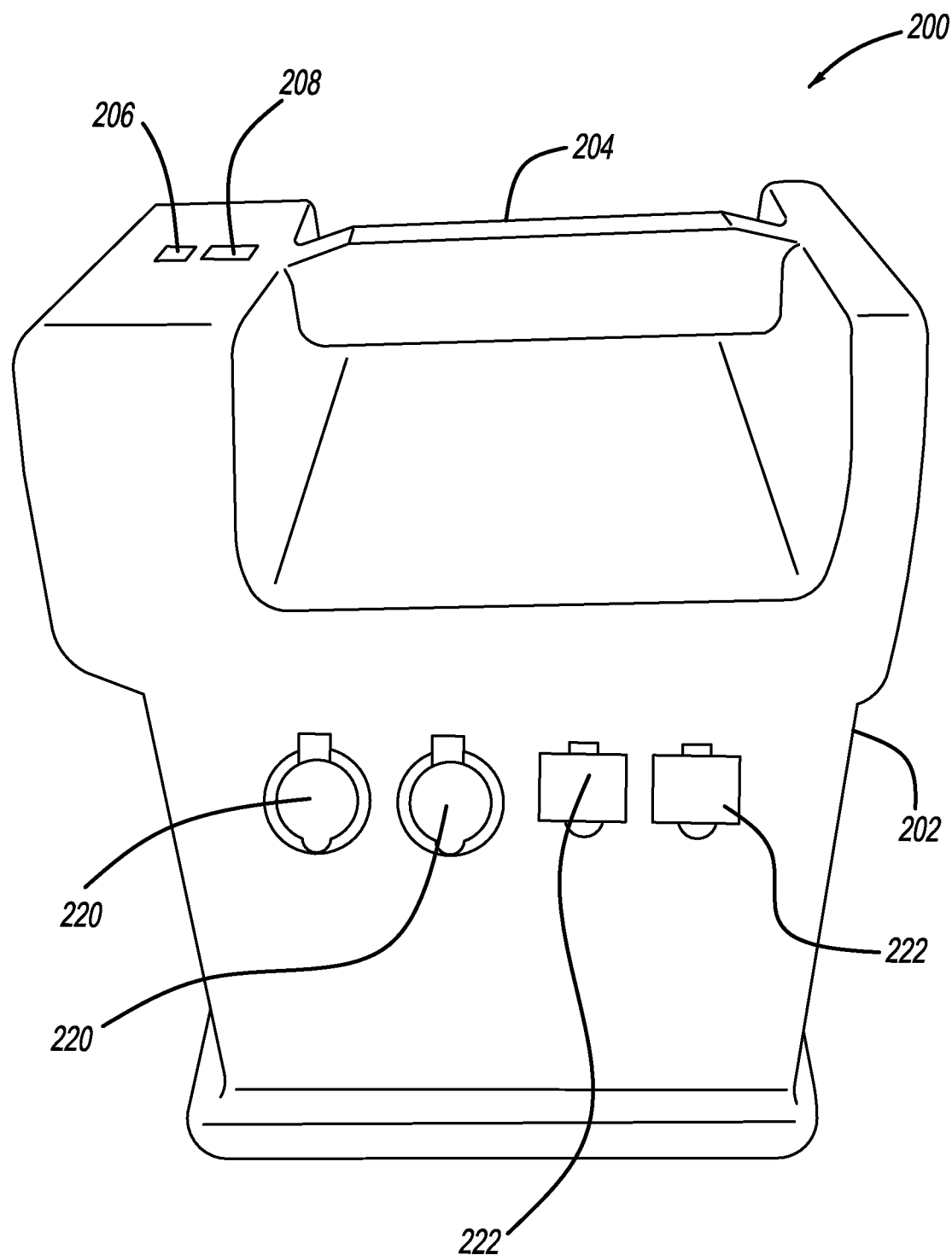
Figure 13B:
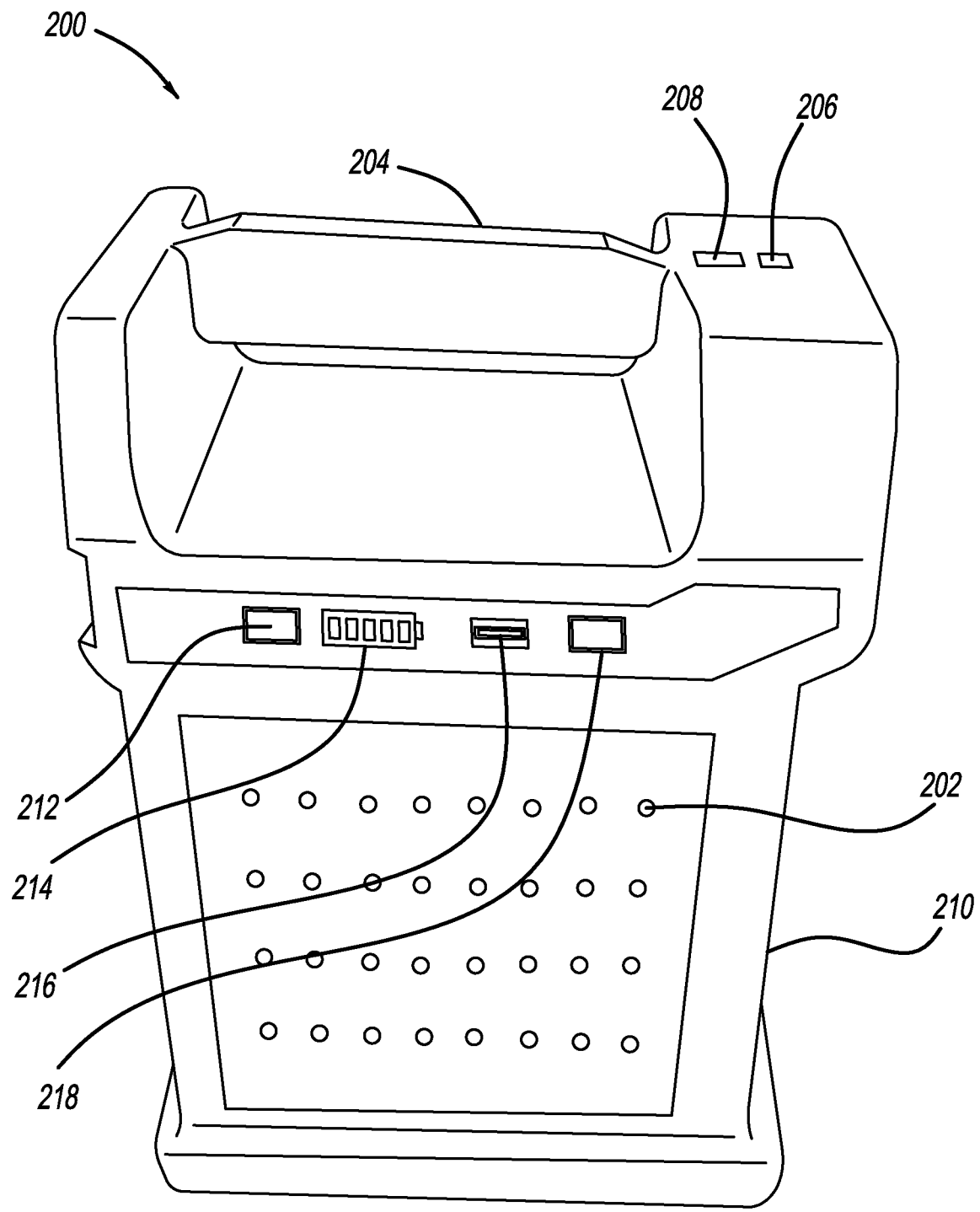
Figure 13C:
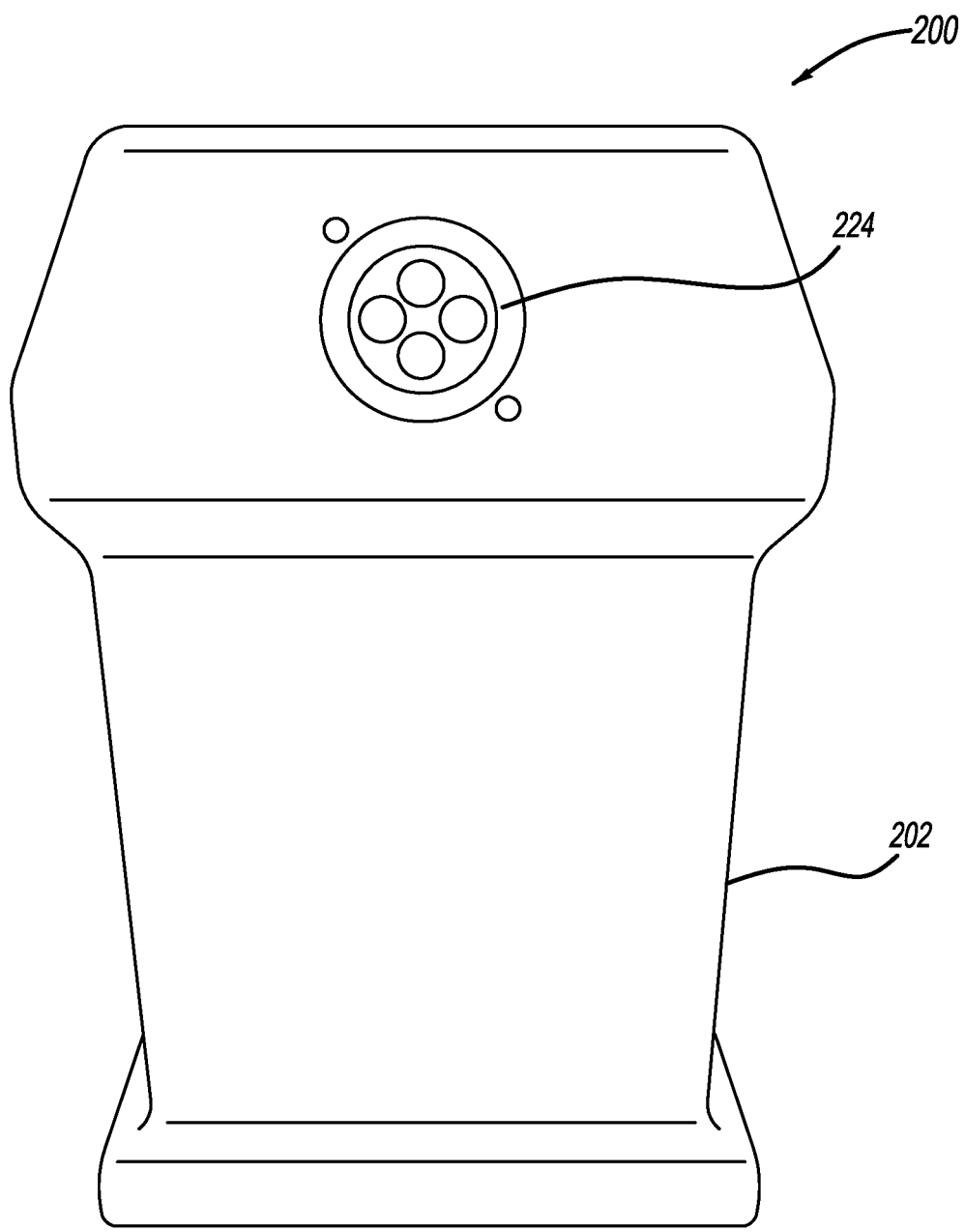
Figure 14A:
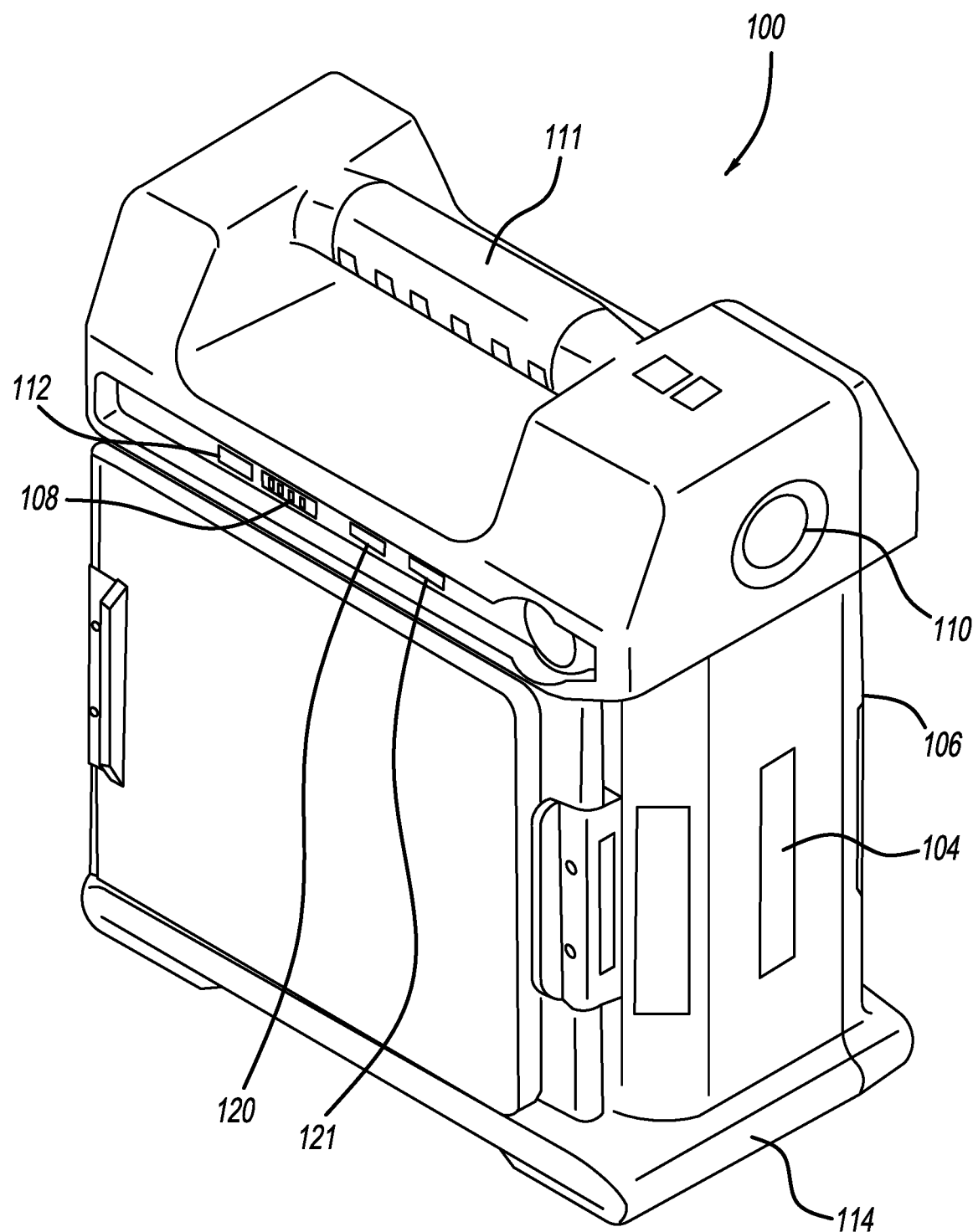
FIGS. 14 A-D show a further example of a power pack according to the disclosure where solar panels are not exposed.
Figure 14B:
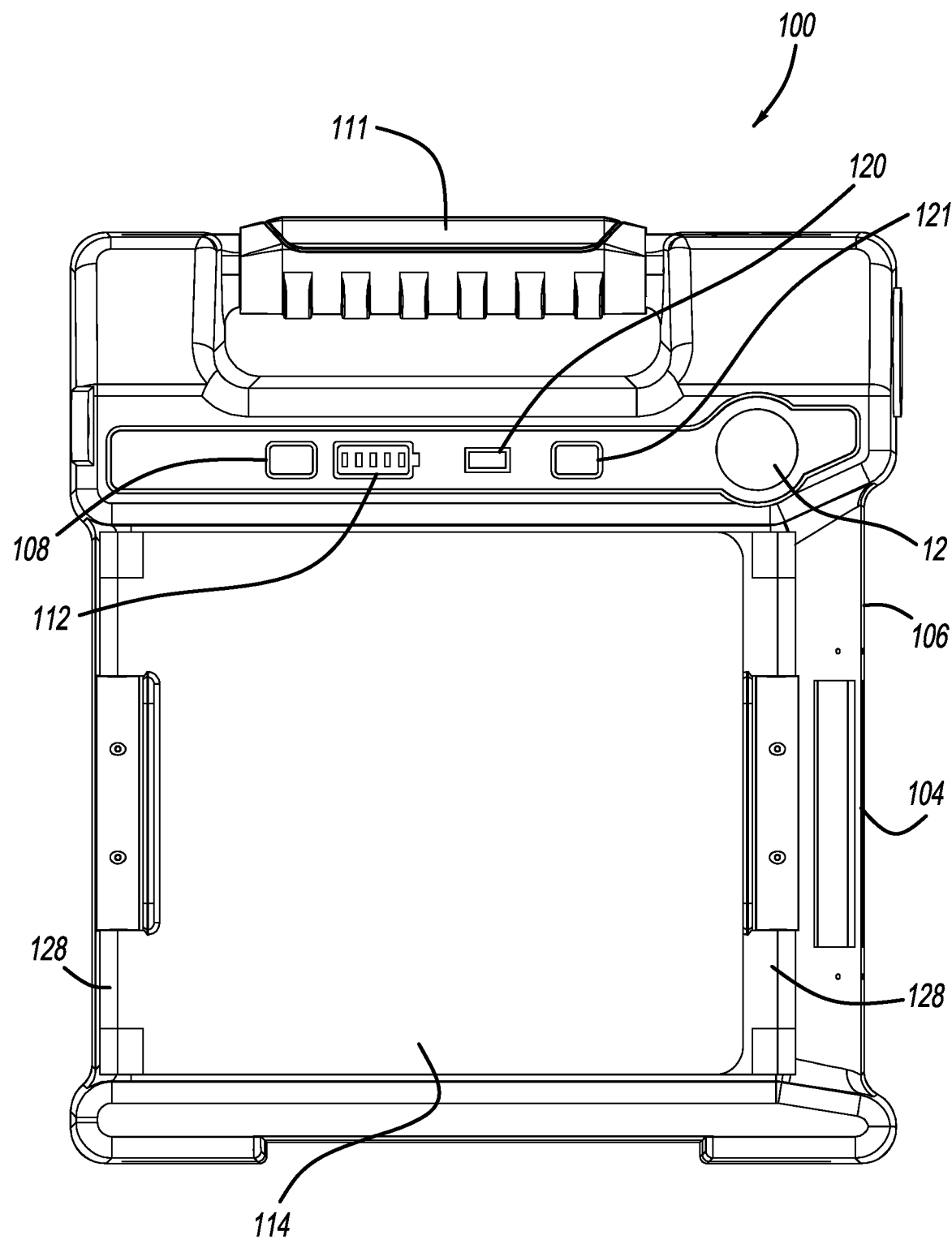
Figure 14C:
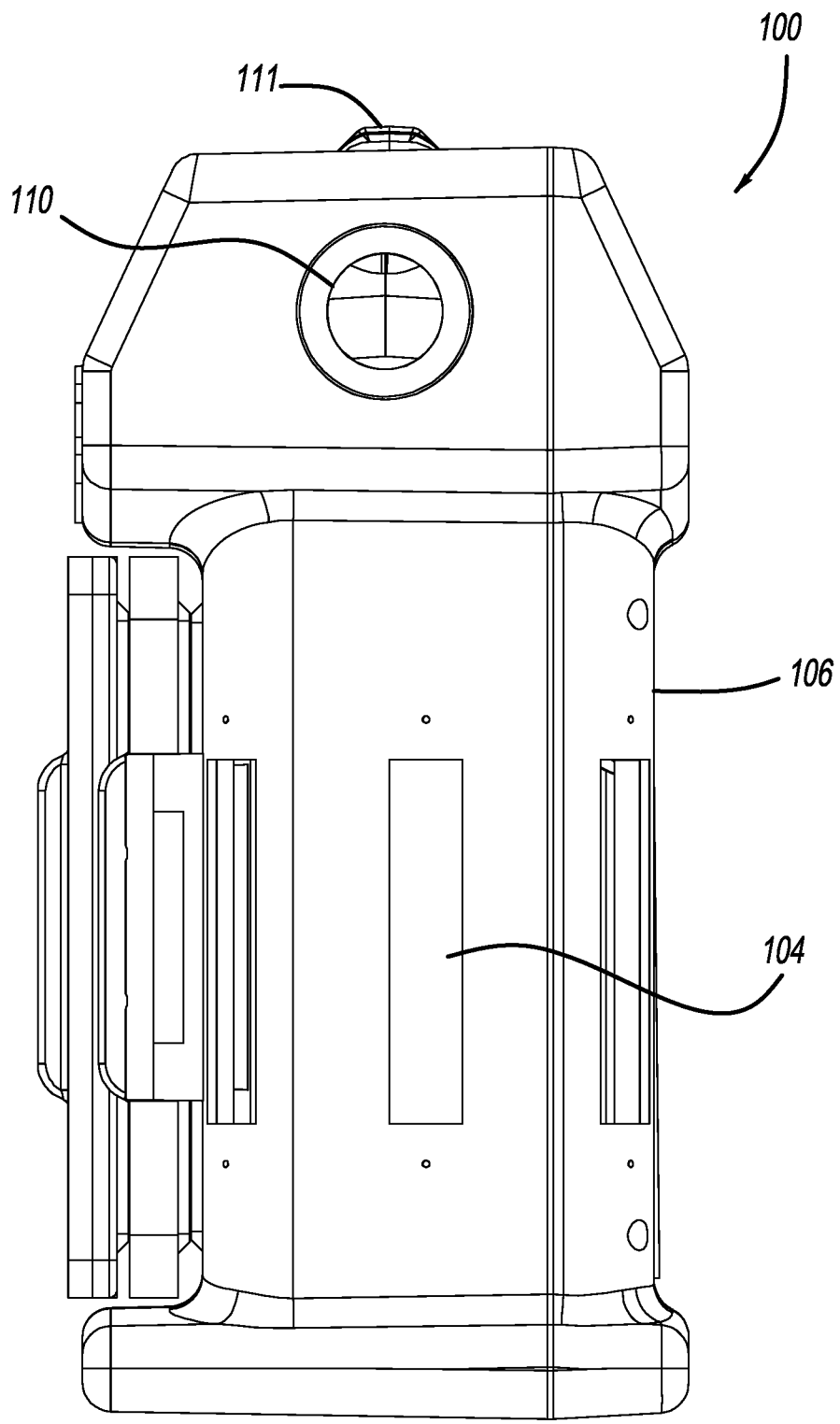
Figure 14D:
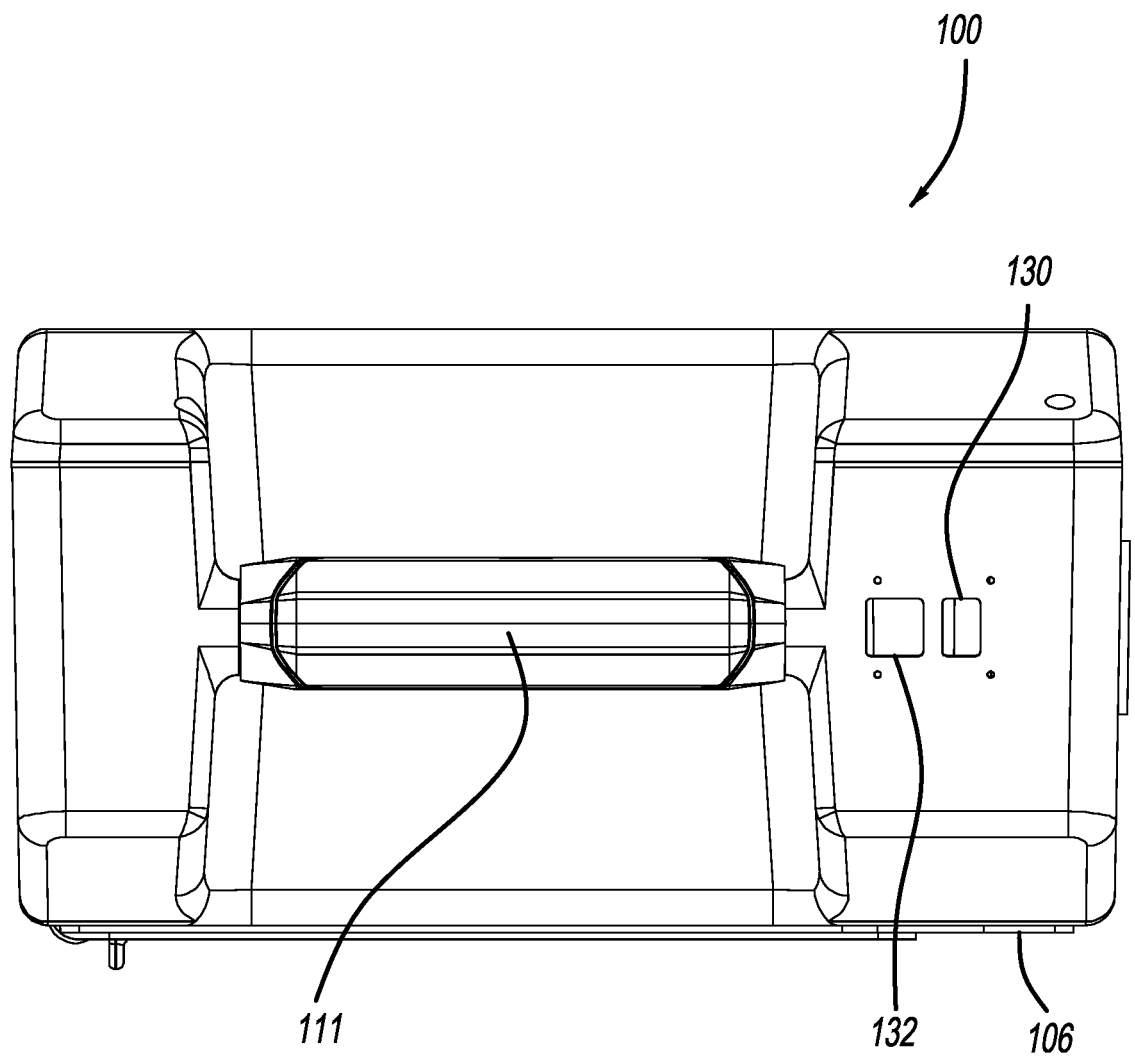

FIGS. 13a, b and c shows a further example of a power pack of the disclosure. In this example, the power pack may have a power output of 600-1000W. In FIG. 13a power pack 200 is shown looking at one side and has case 202 with handle 204. Light switches 206 and 208 are present. In this view, two 12V output ports 220 are visible and well as two input ports 222. In FIG. 13b, a power pack is shown from second side and shows additionally lightboard 210. Battery level indicator 214 is shown with switch 212 and USB port 216 is shown with switch 218. In FIG. 13c, a power pack 200 is seen from another side with case 202 and light 224.

FIGS. 14 A-D show views of a power pack 100 according to the disclosure where the power pack has three solar panels and the solar panels are arranged such that the solar panels are not exposed to light. Power pack 100 has a case 106 with handle 111. Cover 114 encloses solar panels which are not visible in this view. Switch 108 and battery level indicator 112 are shown as wells as USB port 120 with switch 121, 12V port 126. Hinges are shown 128. Spotlight 104 and strip lighting 110 are shown with switches 130, and 132

FIGS. 15 A-D shows views of a power pack 100 according to the disclosure where the power pack has three solar panels and the solar panels are arranged such that the solar panels are exposed to light. That is, the solar panels have been unfolded. Power pack 100 has a case 106 with handle 110. Solar panels 102 are shown in light-exposed position. Switch 108 and battery level indicator 112 are shown as wells as USB port 114, 12V port 126 and corresponding switch 116. Hinges are shown 128, 130. Spotlight 104 and strip lighting 110 are shown.

FIG. 16 illustrates another preferred example of a power pack 300 according to the disclosure. FIG. 16 shows a view of one side of a power pack where the integrated, at least one solar panel, is not exposed to light. Power pack 300 includes case 302 with handle 304. LED Lightboard 306 is integrated into one panel 309 of the power pack where the panel is hinged with hinges 308 such that the panel 309 with lightboard 308 may swing or be moved such that the light board may be positioned to a desired position. This Figure also shows cushioning bumpers 320.

In preferred examples, a power pack of the disclosure includes components that are capable of receiving information from an external source and transmits the information to a user of a power pack. For example, a power pack may include an AM radio and/or an FM radio, where the radio is incorporated into and powered by the power pack and is accessible to a user.

Figure 17:
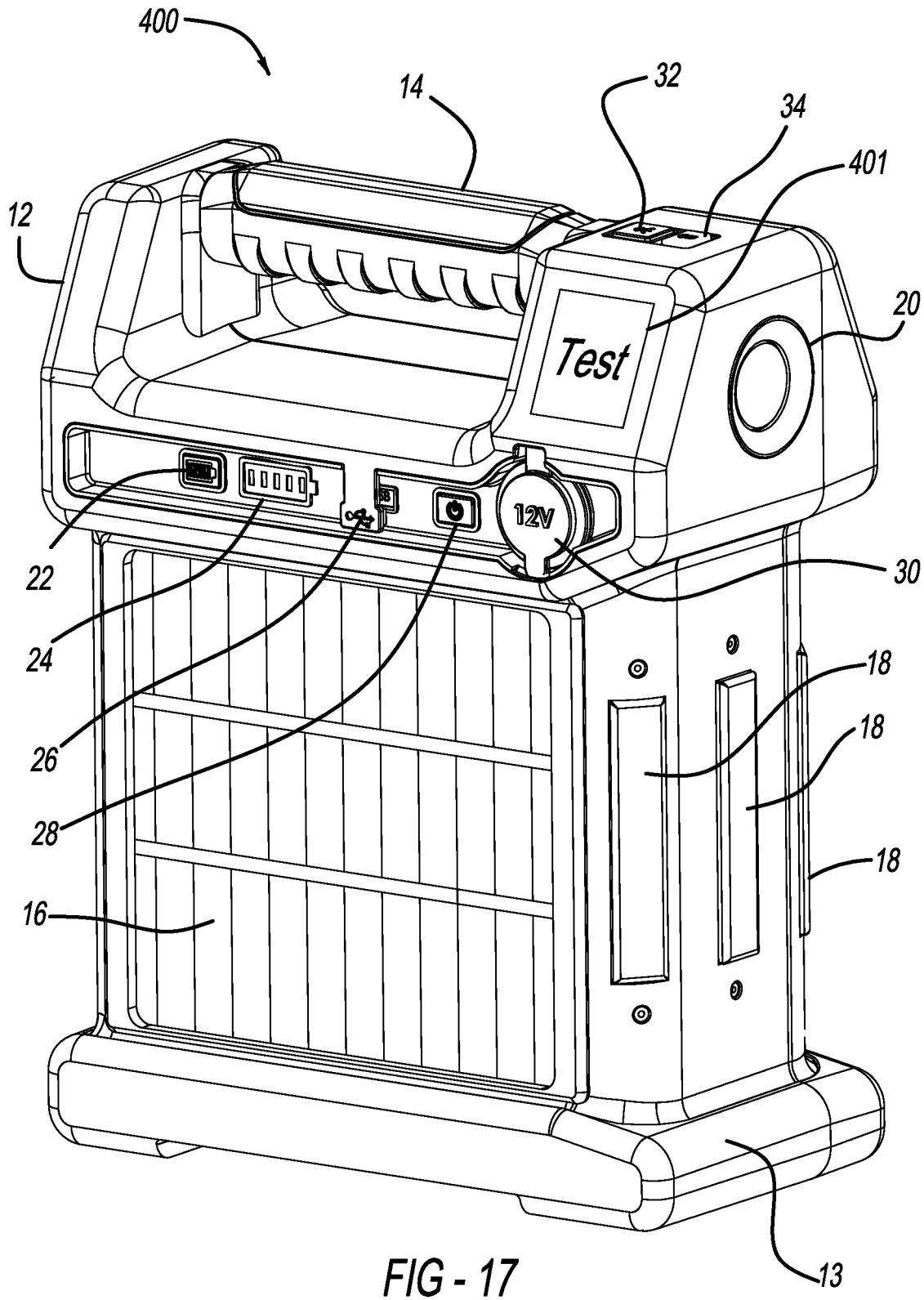
FIG. 17 shows a further example of a power pack where the power pack includes a screen for the display of information.

In another example, a power pack of the disclosure may include Wi-Fi-capable components where the power pack may be part of a Wi-Fi network. The power pack may receive information via the Wi-Fi network. In similar examples, the power pack may include components that allow the power pack to receive information via a cellular network. In preferred examples, the Wi-Fi and/or the cellular network components are incorporated into the power pack. In some examples, the information sent to the power pack may be selective. For example, the user may be able to access or receive weather information or emergency information. In preferred examples, the information may be presented on a screen integrated into the power pack. FIG. 17 shows an example of a display that would present information to battery pack user. In this example, a Power pack of FIG. 1 includes screen 401 integrated into the power pack. In further examples, the display may be placed elsewhere on the power pack. The display may be assume different dimensions.

In additional examples, the power pack may serve as a Wi-Fi hotspot. The power pack may also transmit information to another user's device, such as a phone or computer.

The invention claimed is:

1. A portable power pack, comprising:
   a battery pack, comprising;
     at least one battery;
     at least one thermistor;
   a case;
     said case having four sides, each of said sides having an exterior surface and an interior surface;
   at least one solar panel integrated into said case;
   at least one support structure attached by at least one hinge to said case, said at least one support structure reversibly and manually deployed to position said portable power pack at an angle to the ground of greater than 0 degree to maximize the impingement of light on said at least one solar panel;

said at least one support structure lying flat on an exterior surface of one of said sides of said case when said at least one support structure is not in use;

at least one output port;

at least one input port;

a battery management system; and at least one light, said at least one light projecting light away from said case.

2. The portable power pack of claim 1, wherein said battery pack comprises from one to 40 batteries.

3. The portable power pack of claim 1, wherein said battery pack comprises 4 to 8 batteries.

4. The portable power pack of claim 1, wherein said at least one battery is lithium ion.

5. The portable power pack of claim 1, wherein said power pack has an output of from about 100 watts to about 1200 watts.

6. The portable power pack of claim 1, wherein said power pack weighs from about 4 pounds to about 30 pounds.

7. The portable power pack of claim 1, wherein said at least one light comprises a spotlight.

8. The portable power pack of claim 1, where said portable power pack comprises at least two solar panels;

wherein said at least two solar panels reversibly and manually positioned to reversibly expose said at least two solar panels to light.

9. The portable power pack of claim 8, wherein said power pack has three solar panels integrated into said power pack;

wherein said three solar panels reversibly and manually positioned to reversibly expose said three solar panels to light.

* * * * *